United States Patent
Devane et al.

(10) Patent No.: US 11,449,896 B2
(45) Date of Patent: Sep. 20, 2022

(54) MITIGATION OF DECEPTIVE ADVERTISEMENTS

(71) Applicant: McAfee, LLC, San Jose, CA (US)

(72) Inventors: Oliver G. Devane, Upton (GB); Lee Codel Lawson Tarbotton, Aylesbury (GB); Federico Barbieri, Vizzola P. (IT)

(73) Assignee: McAfee, LLC, San Jose, CA (US)

( * ) Notice: Subject to any disclaimer, the term of this patent is extended or adjusted under 35 U.S.C. 154(b) by 207 days.

(21) Appl. No.: 16/587,751

(22) Filed: Sep. 30, 2019

(65) Prior Publication Data
US 2021/0097569 A1  Apr. 1, 2021

(51) Int. Cl.
| G06F 21/00 | (2013.01) |
| G06Q 30/02 | (2012.01) |
| H04L 9/40  | (2022.01) |
| G06F 21/56 | (2013.01) |
| G06F 21/51 | (2013.01) |

(52) U.S. Cl.
CPC ....... *G06Q 30/0248* (2013.01); *G06F 21/563* (2013.01); *H04L 63/0272* (2013.01); *H04L 63/1425* (2013.01); *G06F 21/51* (2013.01); *H04L 63/145* (2013.01)

(58) Field of Classification Search
CPC ... G06Q 30/0248; G06F 21/563; G06F 21/51; G06F 2221/2119; H04L 63/0272; H04L 63/1425; H04L 63/145
See application file for complete search history.

(56) References Cited

U.S. PATENT DOCUMENTS

| 8,990,945 B1* | 3/2015 | Ranadive | H04L 63/1433 726/24 |
| 9,767,480 B1* | 9/2017 | Gottlieb | G06Q 30/0277 |
| 10,116,688 B1* | 10/2018 | Yun | H04L 63/145 |
| 10,699,295 B1* | 6/2020 | Le Chevalier | G06F 16/951 |
| 2006/0253584 A1* | 11/2006 | Dixon | H04L 67/02 709/225 |
| 2009/0171990 A1* | 7/2009 | Naef, III | G06Q 10/06 |
| 2009/0276313 A1* | 11/2009 | Wilhelm | G06Q 30/0267 705/14.54 |
| 2010/0251371 A1* | 9/2010 | Brown | G06F 21/554 726/23 |

(Continued)

OTHER PUBLICATIONS

Ruhi Mahajan, "Design and Development of Improved Stealth Alternate Data Streams", Jul. 2014, Thesis of Master of Engineering in Computer Science and Engineering, Thapar University. (Year: 2014).*

*Primary Examiner* — Trong H Nguyen
*Assistant Examiner* — Michael M Lee
(74) *Attorney, Agent, or Firm* — Patent Capital Group

(57) ABSTRACT

There is disclosed in one example a computing apparatus, including: a processor and a memory; instructions encoded within the memory to instruct the processor to: identify a downloaded file on a file system; inspect a metadata object attached to the downloaded file; parse the metadata object to extract an advertiser identification string from a GET code portion of a uniform resource locator (URL); query a reputation cache for a reputation for the advertiser identification string; receive a deceptive reputation for the advertiser identification string; and take a remedial action against the downloaded file.

20 Claims, 11 Drawing Sheets

(56) References Cited

U.S. PATENT DOCUMENTS

| | | | |
|---|---|---|---|
| 2015/0281258 A1* | 10/2015 | Watkins | G06Q 30/0277 |
| | | | 726/23 |
| 2016/0134588 A1* | 5/2016 | Falkowitz | H04L 63/1441 |
| | | | 726/11 |
| 2016/0226913 A1* | 8/2016 | Sood | G06F 21/577 |
| 2016/0358209 A1* | 12/2016 | Shiravi Khozani | ............ |
| | | | G06Q 30/0255 |
| 2017/0093910 A1* | 3/2017 | Gukal | H04L 63/1425 |

* cited by examiner

MITIGATION OF DECEPTIVE ADVERTISEMENTS

FIELD OF THE SPECIFICATION

This application relates in general to computer security, and more particularly, though not exclusively, to a system and method for providing mitigation of deceptive advertisements.

BACKGROUND

Modern computing ecosystems often include "always on" broadband internet connections. These connections leave computing devices exposed to the internet, and the devices may be vulnerable to attacks, including deceptive advertisements.

BRIEF DESCRIPTION OF THE DRAWINGS

The present disclosure is best understood from the following detailed description when read with the accompanying FIGURES. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion. Furthermore, the various block diagrams illustrated herein disclose only one illustrative arrangement of logical elements. Those elements may be rearranged in different configurations, and elements shown in one block may, in appropriate circumstances, be moved to a different block or configuration.

SUMMARY

Figure 1:
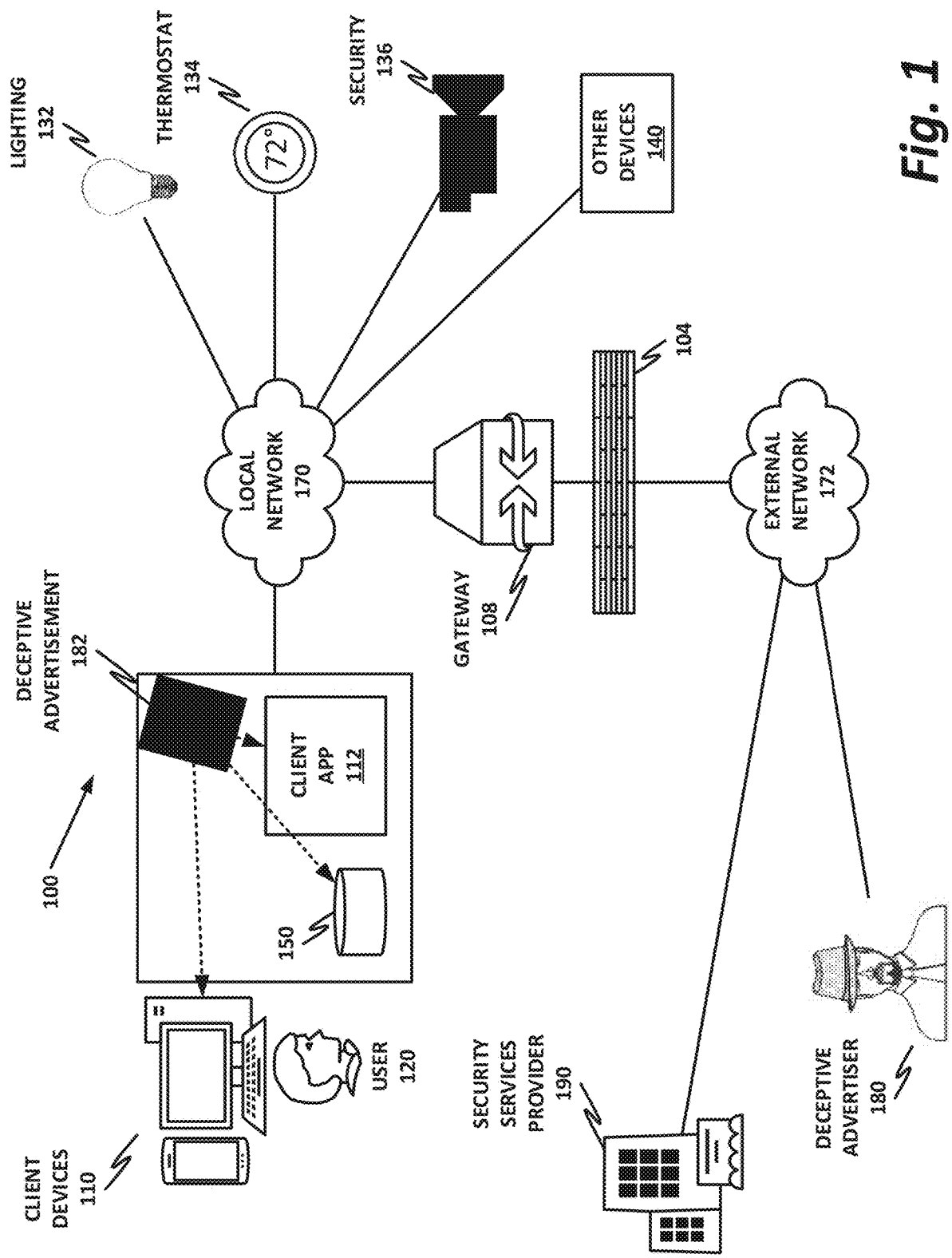
FIG. 1 is a block diagram illustrating selected elements of a security ecosystem.

In an example, there is disclosed a computing apparatus, comprising: a processor and a memory; instructions encoded within the memory to instruct the processor to: identify a downloaded file on a file system; inspect a metadata object attached to the downloaded file; parse the metadata object to extract an advertiser identification string from a GET code portion of a uniform resource locator (URL); query a reputation cache for a reputation for the advertiser identification string; receive a deceptive reputation for the advertiser identification string; and take a remedial action against the downloaded file.

EMBODIMENTS OF THE DISCLOSURE

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

Distributed methods of advertising in the modern information age present challenges with respect to user security, privacy, and comfort. In a popular business model, a software vendor advertises a product for sale via advertising partners.

For example, a software vendor initiates an advertising campaign, and enlists the services of a number of advertising partners. This may be more efficient than the software vendor advertising its product directly, because the advertising partners may have dedicated business practices for advertising. The advertising partners are therefore able to use their expertise and infrastructure in the advertising domain to efficiently advertise the product. When the advertising partner makes a sale on behalf of the software vendor, the software vendor then pays the advertising partner a per-sale commission.

A common method of performing an advertising campaign is to assign a unique alphanumeric string to the campaign, and to the provider. The software vendor may, for example, provide a free download of an evaluation version of the software. When the user downloads the free evaluation version responsive to an advertisement, identifying information is stored with the download file (e.g., in a hidden file stream). Microsoft's New Technology File System (NTFS) includes the concept of alternative data streams. An alternative data stream (ADS) may include file data and/or metadata that are associated with files in the NTFS, but that are not easily visible to the end user. The advertiser may use the ADS associated with the downloaded executable to store metadata about the download. For example, the Zone.Identifier ADS is a popular location to store metadata about the URL from which a file was downloaded. This URL may include HTML GET code embedded within the URL, which identifies the advertiser with an advertiser ID or provider ID associated with the campaign ID. An example of HTML GET code that may be found in a Zone.Identifier file follows:

```
[ZoneTransfer]
ZoneId=3
ReferrerUrl=http://www.unifysystemtools.club/lp/gsmb/?feedback&x
_contexts=M2019052417-6b9134b590da363a28a04c5c42b8dd8ft&utm_sour
ce=wgsmbi&utm_campaign=wgsmbi&px1=WGS4619_WGS4521_RUN&utm_pubid=
1628fbe4-a727-45b6-95ff-77190fc27d92&override=1
HostUrl=http://dl.unifysystemtools.club/qbps/securer/unifysystem
tools_club/qbssetup.exe
```

Thus, when the user runs the executable, or when the user purchases the full version of the utility, the advertiser can be identified, and the commission paid.

A drawback of these advertising campaigns is that they essentially insulate software vendors from the bad behavior of advertisers. In an illustrative example, the software vendor provides a security utility, such as an antivirus scanner or similar. The software vendor then partners with a number of advertising partners, and pays a commission when a partner is identified as making a sale. However, some of the advertisers are unscrupulous. These advertisers may push out obnoxious and deceptive advertisements that purport to have found a virus infection or other security issue with the user's machine. These deceptive advertisements then encourage the user to download the utility to protect their machine from further infection. Although the software vendor itself may not condone this behavior, it is difficult to police all of the advertising providers.

Embodiments of the present specification provide a system and method used to identify malicious advertisements. These deceptive advertisements are both a nuisance to the end user, and may in some cases present a security risk. Because of these unscrupulous advertising practices, end users may not always be aware of what kind of software they're downloading, and may be led by similar advertisements to download malicious software.

Embodiments of the system and method of the present specification provide for mitigation of these deceptive advertising practices. In one embodiment, the concept of reputations as used in antivirus applications may be applied to deceptive advertising practices. A prerequisite for an effective reputation infrastructure is to sufficiently identify the object or entity receiving the reputation. In this case, the campaign identifier and/or partner identifier can be used separately, or in combination, to assign a reputation.

The use of campaign and/or partner identifiers is beneficial, because the deceptive advertisers are encouraged to consistently use the same campaign and advertiser ID. This is because, if they do not use the right campaign and advertiser ID, then they will not be paid for the advertisement when a user installs the paid version of the software. This is in contrast to unscrupulous advertisers' common practice of frequently changing URLs. For example, unscrupulous advertisers may buy large blocks of deceptive domain names and change their URLs frequently, such as on a daily basis. Some existing security solutions attempt to identify malicious advertisers by these URLs. But the URLs change so frequently that by the time one is identified, the time to live for the usefulness of that identification may be very short.

In contrast, an advertising campaign may last for a period of weeks or months. For example, the software vendor may release a new version of its software, or a completely new software product. At the launch of this new version or product, the software vendor may engage in an aggressive advertising campaign to build a new user base. This campaign may last for weeks or months after the initial release.

Thus, while the URLs used by unscrupulous advertisers may change frequently, the time to live for a campaign ID and/or partner ID may be on the order of weeks or months.

In some embodiments, existing security infrastructures may be used to assign and enforce reputations. For example, existing software installed on end user machines may include anti-adware features that help to protect end users from malicious advertisements. These security engines existing on the user's machine can be modified with a deceptive advertisement engine that can protect the user from deceptive advertisements. Furthermore, endpoint devices, including consumer endpoints and enterprise endpoints, may already be configured to communicate with a global or enterprise threat or security database. For example, MCAFEE, LLC provides global threat intelligence (GTI™), which maintains a global database of known threats. When a campaign ID and/or associated partner ID are associated with a malicious or deceptive reputation, that reputation can be maintained globally in an enterprise or global threat intelligence database. As end users then encounter new objects, the database can be queried for a reputation to associate with the campaign ID and/or partner ID.

Furthermore, in some embodiments, enterprise gateways may be configured to use the reputation data derived herein to provide enterprise-wide mitigation of deceptive advertisements. In an embodiment, an enterprise gateway includes a deceptive advertisement identification engine that monitors network traffic coming into the enterprise. When a URL includes a partner ID or campaign ID that has received a reputation of being deceptive, the associated URL may be blocked by the enterprise gateway. This ensures that once a campaign and/or advertiser gets a reputation for being deceptive, the advertisements are blocked from the enterprise.

In some examples, identification of deceptive advertisements may be based on behavioral or heuristic models. For example, deceptive advertisements may use bright colors, flashing colors or text, high-volume sound, sound of a particular pitch (e.g., to emulate an alarm siren or klaxon), or other obnoxious interface elements to get the user's attention. Furthermore, because these deceptive advertisements tend to be annoying, security-savvy users who are not deceived by the alleged error message may quickly take action such as closing the browser or closing the advertisement. These behavioral actions may provide inputs to a heuristic model that can be used to identify deceptive advertisements.

Furthermore, there is no required or standardized method for providing campaign identifiers or partner identifiers. However, in cases where the software vendor is a legitimate software vendor, the vendor may not take special precautionary measures to try to conceal the nature of the advertising campaign or partner ID. Rather, they may use common keywords such as "campaign," "advertiser," "partner," "referrer," or similar. To ensure remuneration for the advertisement services, the deceptive advertisers may be locked into this identification schema. Thus, as long as a software vendor itself does not have deceptive intent, it may be relatively straightforward to identify campaign and partner IDs. This may be done via keyword matching, regular expression matching, or heuristic analysis of known advertising campaigns.

The decision of what to do once an advertisement or referrer has been identified as deceptive may depend on the context and the needs of the enterprise. In some examples, these deceptive advertisements may be blocked by an enterprise gateway. In other examples, they may be blocked on the user's endpoint device, or interaction with these deceptive advertisements may be disabled.

A system and method for providing mitigation of deceptive advertisements will now be described with more particular reference to the attached FIGURES. It should be noted that throughout the FIGURES, certain reference numerals may be repeated to indicate that a particular device or block is referenced multiple times across several FIGURES. In other cases, similar elements may be given new numbers in different FIGURES. Neither of these practices is intended to require a particular relationship between the various embodiments disclosed. In certain examples, a genus or class of elements may be referred to by a reference numeral ("widget 10"), while individual species or examples of the element may be referred to by a hyphenated numeral ("first specific widget 10-1" and "second specific widget 10-2").

FIG. 1 is a block diagram illustrating a security ecosystem 100. In the example of FIG. 1, security ecosystem 100 may be an enterprise, a government entity, a data center, a telecommunications provider, a "smart home" with computers, smart phones, and various internet of things (IoT) devices, or any other suitable ecosystem. Security ecosystem 100 is provided herein as an illustrative and nonlimiting example of a system that may employ, and benefit from, the teachings of the present specification.

Within security ecosystem 100, one or more users 120 operate one or more client devices 110. A single user 120 and single client device 110 are illustrated here for simplicity, but a home or enterprise may have multiple users, each of which may have multiple devices, such as desktop computers, laptop computers, smart phones, tablets, hybrids, or similar.

Client devices 110 may be communicatively coupled to one another and to other network resources via local network 170. Local network 170 may be any suitable network or combination of one or more networks operating on one or more suitable networking protocols, including a local area network, a home network, an intranet, a virtual network, a wide area network, a wireless network, a cellular network, or the internet (optionally accessed via a proxy, virtual machine, or other similar security mechanism) by way of nonlimiting example. Local network 170 may also include one or more servers, firewalls, routers, switches, security appliances, antivirus servers, or other network devices, which may be single-purpose appliances, virtual machines, containers, or functions. Some functions may be provided on client devices 110.

In this illustration, local network 170 is shown as a single network for simplicity, but in some embodiments, local network 170 may include any number of networks, such as one or more intranets connected to the internet. Local network 170 may also provide access to an external network, such as the internet, via external network 172. External network 172 may similarly be any suitable type of network.

Local network 170 may connect to the internet via gateway 108, which may be responsible, among other things, for providing a logical boundary between local network 170 and external network 172. Local network 170 may also provide services such as dynamic host configuration protocol (DHCP), gateway services, router services, and switching services, and may act as a security portal across local boundary 104.

Local network 170 may also include a number of discrete IoT devices. For example, local network 170 may include IoT functionality to control lighting 132, thermostats or other environmental controls 134, a security system 136, and any number of other devices 140. Other devices 140 may include, as illustrative and nonlimiting examples, network attached storage (NAS), computers, printers, smart televisions, smart refrigerators, smart vacuum cleaners and other appliances, and network connected vehicles.

Local network 170 may communicate across local boundary 104 with external network 172. Local boundary 104 may represent a physical, logical, or other boundary. External network 172 may include, for example, websites, servers, network protocols, and other network-based services. In one example, a deceptive advertiser 180 (or other similar malicious or negligent actor) also connects to external network 172. A security services provider 190 may provide services to local network 170, such as security software, security updates, network appliances, or similar. For example, MCAFEE, LLC provides a comprehensive suite of security services that may be used to protect local network 170 and the various devices connected to it from deceptive advertisements.

It may be a goal of users 120 to successfully operate devices on local network 170 without interference from deceptive advertiser 180. In one example, deceptive advertiser 180 is a malware author whose goal or purpose is to cause malicious harm or mischief, for example, by injecting deceptive advertisement 182 into client device 110. Once deceptive advertisement 182 gains access to client device 110, it may try to perform work such as social engineering of user 120, a hardware-based attack on client device 110, modifying storage 150 (or volatile memory), modifying client application 112 (which may be running in memory), or gaining access to local resources. Furthermore, attacks may be directed at IoT objects. IoT objects can introduce new security challenges, as they may be highly heterogeneous, and in some cases may be designed with minimal or no security considerations. To the extent that these devices have security, it may be added on as an afterthought. Thus, IoT devices may in some cases represent new attack vectors for deceptive advertiser 180 to leverage against local network 170.

Malicious harm or mischief may take the form of installing root kits or other malware on client devices 110 to tamper with the system, installing spyware or adware to collect personal and commercial data, defacing websites, operating a botnet such as a spam server, or simply to annoy and harass users 120. Thus, one aim of deceptive advertiser 180 may be to install his malware on one or more client devices 110 or any of the IoT devices described. As used throughout this specification, it may be understood that deceptive advertisements may have undesirable security implications. In addition to not always advertising legitimate products, deceptive advertisements may carry payloads including malicious software ("malware"), which can include any object configured to provide unwanted results or do unwanted work.

Malware objects may be embedded in deceptive advertisements in the form of executable objects, including, by way of nonlimiting example, viruses, Trojans, zombies, rootkits, backdoors, worms, spyware, adware, ransomware, dialers, payloads, malicious browser helper objects, tracking cookies, loggers, or similar objects designed to take a potentially-unwanted action, including, by way of nonlimiting example, data destruction, data denial, covert data collection, browser hijacking, network proxy or redirection, covert tracking, data logging, keylogging, excessive or deliberate barriers to removal, contact harvesting, and unauthorized self-propagation. In some cases, deceptive advertisements could also include negligently-developed software that causes such results even without specific intent.

In enterprise contexts, deceptive advertiser 180 may also want to commit industrial or other espionage, such as stealing classified or proprietary data, stealing identities, or gaining unauthorized access to enterprise resources. Thus, deceptive advertiser 180's strategy may also include trying to gain physical access to one or more client devices 110 and operating them without authorization, so that an effective security policy may also include provisions for preventing such access.

In another example, an advertiser may not explicitly have malicious intent, but may spread software that poses a security risk. For example, a well-known and often-exploited security flaw is the so-called buffer overrun, in which a malicious user is able to enter an overlong string into an input form and thus gain the ability to execute arbitrary instructions or operate with elevated privileges on a computing device. Buffer overruns may be the result, for example, of poor input validation or use of insecure libraries, and in many cases arise in nonobvious contexts. Thus, although not malicious, advertisers contributing software to an application repository or programming an IoT device may inadvertently provide attack vectors for bad actors. Poorly-written applications may also cause inherent problems, such as crashes, data loss, or other undesirable behavior. Because such software may be desirable itself, it may be beneficial for developers to occasionally provide updates or patches that repair vulnerabilities as they become known. However, from a security perspective, these updates and patches are essentially new objects that must themselves be validated.

Local network 170 may contract with or subscribe to a security services provider 190, which may provide security services, updates, antivirus definitions, deceptive advertisement remediation (including a global or enterprise store or repository of advertiser reputations), patches, products, and services. MCAFEE, LLC is a nonlimiting example of such a security services provider that offers comprehensive security and antivirus solutions. In some cases, security services provider 190 may include a threat intelligence capability such as the GTI™ database provided by MCAFEE, LLC, or similar competing products. Security services provider 190 may update its threat intelligence database by analyzing new candidate deceptive advertisements as they appear on client networks and characterizing them as malicious or benign.

Other security considerations within security ecosystem 100 may include parents' or employers' desire to protect children or employees from undesirable content, such as pornography, adware, spyware, age-inappropriate content, advocacy for certain political, religious, or social movements, or forums for discussing illegal or dangerous activities, by way of nonlimiting example.

Figure 2:
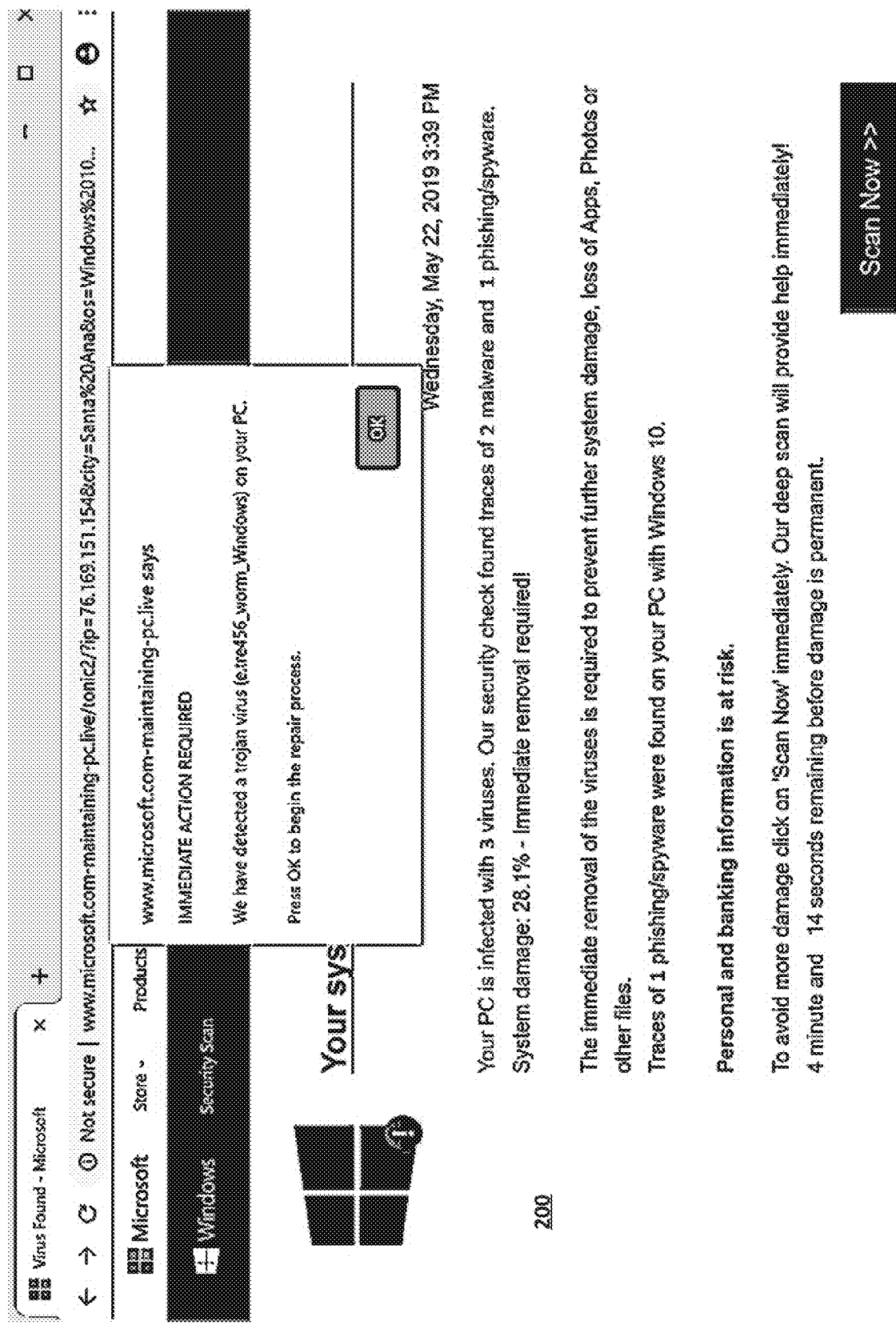
FIG. 2 is an illustration of a user interface.

FIG. 2 is an illustration of a user interface 200. In this case, user interface 200 includes a web browser that has been directed to a URL. This URL appears to be suspicious. For example, the URL includes the string "www.microsoft. com," which may make the URL appear to an unwary user to be hosted on the Microsoft.com domain. The interface of the URL also replicates features that may be found on the Microsoft website, such as the Microsoft logo, a "store" menu that appears to direct to a subdomain to purchase Microsoft products, a "products" menu that appears to direct to a subdomain that describes Microsoft products, and a large banner that says "Windows Security Scan."

If a user is unwary, the user may be deceived into believing that this is a legitimate Microsoft website, and is trusted. However, for a wary user, there are some indicia that the website is not legitimate. First, the browser indicates that this website is "not secure." This warning may appear when a website does not use hypertext transfer protocol secure (HTTPS), but rather uses plain unencrypted hypertext transfer protocol (HTTP). In contemporary practice, most legitimate websites will use HTTPS to encrypt their traffic back and forth. However, deceptive advertisers may not use HTTPS, because use of HTTPS may require securing a valid certificate. Some certificate issuing authorities may not issue certificates to such domain names because they appear to be deceptive. Furthermore, securing a certificate from a certificate authority may cost money, and because deceptive advertisers change their URLs quickly (e.g., on a daily basis), it may not be cost-effective for them to secure certificates for each new URL.

In some embodiments of the present specification, URL scanning may not be activated for HTTPS domains. This is because HTTPS domains are unlikely to be used by deceptive advertisers. Deceptive advertisers are much more likely to use unencrypted HTTP connections. In embodiments where scanning of domain names or URLs is restricted to unencrypted HTTP connections, the efficiency of the system can be increased by not examining every URL that the user visits. Because most legitimate URLs will use secured HTTPS connections, in modern practice the use of plain, unencrypted HTTP itself may be deemed suspicious. Furthermore, as HTTP connections are not secured, the possibility for data leakage is much greater. Thus, even absent deceptive advertising mitigation, it may be beneficial for the enterprise or home user to provide additional scrutiny to unencrypted HTTP connections.

Another indicium of deceptive intent is the URL, itself. Although the initial portion of the URL appears to be hosted on the Microsoft.com domain, a closer inspection will reveal that the words "Microsoft.com" are not followed by a forward slash, but rather are followed by a hyphen and then the actual domain name, "Maintaining-PC.live." Maintaining-PC.live is not known to be an official domain hosted by Microsoft, and is more likely to be a questionable URL used by a deceptive advertiser. However, the unwary user may dismiss the Maintaining-PC.live portion of the URL as a redirection to a subdirectory.

The content of the website itself is also suspicious. The website claims, "Your PC is infected with three viruses. Our security check found traces of two malware and one phishing/spyware. System damage: 28.1%-immediate removal required!"

The website also spawns a pop-up window with the text, "IMMEDIATE ACTION REQUIRED." The pop-up claims, "We have detected a Trojan virus (E.TRE456_worm_windows) on your PC." The user is then encouraged to, "Press 'okay' to begin the repair process."

If the webpage is provided by a deceptive advertiser, then if the user clicks "okay," she may be redirected to a download site where she can download a copy of the installer for the software being advertised. The redirected website will most likely claim that if the user installs the software, she will be able to repair the alleged damage to her machine.

If the user downloads the installer, and ultimately purchases the full version of the software, then the deceptive advertiser will get credit for the sale. A common mechanism for crediting an advertiser with the sale is the use of an NTFS alternative data stream (ADS), such as the Zone.Identifier ADS. On a Macintosh OS X or iOS device, similar information may be provided in an HFS+ fork. Various Unix and Linux file systems may also provide analogs to the NTFS ADS.

When the user runs the installer she has downloaded, the Zone.Identifier ADS (or an analog thereof) may be carried forward to the installed executable. Thus, even if the user deletes the original installer after installing, the advertiser can still get credit for the sale if the user ultimately pays to unlock the full version of the software. Note that the use of a demo version, with a full version unlockable on payment by the user, is a common practice for selling software. However, it is also possible that the user could be required to pay for the software in the first instance, when she downloads the software. In that case, the deceptive advertiser would likewise get credit for the sale.

Because user interface 200 includes numerous indicia of deceptive advertising intent, it may be beneficial to identify the advertiser and/or campaign that provided the deceptive advertisement, to assign that advertiser and/or campaign a deceptive reputation, and to block advertisements from that advertiser in the future. Determining that user interface 200 displays a deceptive advertisement can be based on a number of behavioral and heuristic models. For example, the decision may be based on the use of Microsoft.com in a non-Microsoft domain name, the use of pop-ups, the allegation of infection with a virus and/or an alleged quantitative assessment of damage to the system, the use of trademarked Windows logos, or other similar indicia. Furthermore, if the user is savvy, she may immediately close the deceptive advertisement, and dismiss the window. When a user immediately closes the window and dismisses it, this may be an indication that the content is undesirable. In other cases, the deceptive advertisement could employ tactics such as spawning multiple pop-ups, spawning pop-under windows, and using loud sounds, bright or flashing text, or other methods to try to get the user's attention. Heuristic models can be built on all of these factors to assign a deceptive reputation to an advertiser.

Once the advertiser has received a deceptive reputation, a deceptive advertisement remediation engine may use the advertiser or referrer ID, and/or campaign ID, to block further activity. As discussed above, use of the referrer ID may realize advantages over systems that block based on URL or other factors. URLs may change frequently, and heuristic analysis of every website or pop-up every time can be resource intensive. However, the use of deceptive advertiser reputations can provide a gateway function. Advertisements from deceptive advertisers are blocked before they ever reach the end user, and thus additional analysis may not be necessary.

Figure 3:
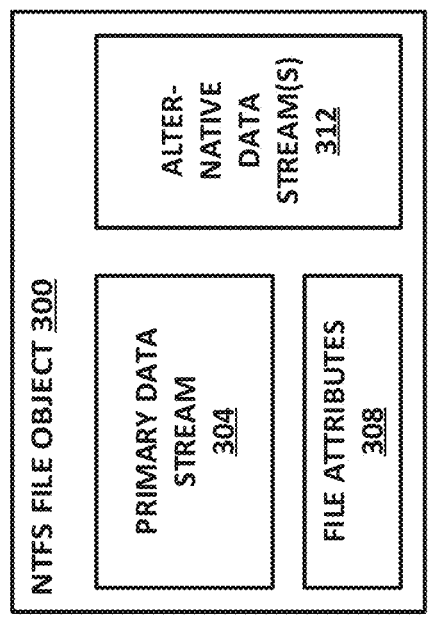
FIG. 3 is a block diagram of a Microsoft Windows New Technology File System (NTFS) file object.

FIG. 3 is a block diagram of a Microsoft Windows New Technology File System (NTFS) file object 300. NTFS file object 300 includes not only the information that is visible to the user when the user opens or interacts with the file, but also includes metadata and other data streams.

In this example, which shows only selected elements of NTFS file object 300, a primary data stream 304 provides the data stream that the user actually interacts with. For example, if NTFS file object 300 is an executable file, then primary data stream 304 includes the executable object code. If NTFS file object 300 is a word processing document, then primary data stream 304 includes the text and markup containers used to format and edit the word processing file.

NTFS file object 300 may also include file attributes 308. File attributes 308 include metadata about the file, and at least some file attributes 308 may be editable by the user via a common user interface such as the Windows shell. Table 1 below lists examples of NTFS file attributes, by way of illustrative and nonlimiting example:

TABLE 1

File Attributes Defined by NTFS

| Attribute Type | Description |
| --- | --- |
| Standard Information | Includes information such as timestamp and link count. |
| Attribute List | Lists the location of all attribute records that do not fit in the MFT record. |
| File Name | A repeatable attribute for both long and short file names. The long name of the file can be up to 255 Unicode characters. The short name is the 8.3, case-insensitive name for the file. Additional names, or hard links, required by POSIX can be included as additional file name attributes. |
| Security Descriptor | Describes who owns the file and who can access it. |
| Data | Contains file data. NTFS allows multiple data attributes per file. Each file typically has one unnamed data attribute. A file can also have one or more named data attributes, each using a particular syntax. |
| Object ID | A volume-unique file identifier. Used by the distributed link tracking service. Not all files have object identifiers. |
| Logged Utility Stream | Similar to a data stream, but operations are logged to the NTFS log file just like NTFS metadata changes. This is used by EFS. |
| Reparse Point | Used for volume mount points. They are also used by Installable File System (IFS) filter drivers to mark certain files as special to that driver. |
| Index Root | Used to implement folders and other indexes. |
| Index Allocation | Used to implement folders and other indexes. |
| Bitmap | Used to implement folders and other indexes. |
| Volume Information | Used only in the $Volume system file. Contains the volume version. |
| Volume Name | Used only in the $Volume system file. Contains the volume label. |

NTFS file object 300 may also include alternative data streams 312. Alternative data streams 312 are data streams that exist essentially in parallel to primary data stream 304. Alternative data streams 312 can have many purposes. For example, in some embodiments, alternative data streams 312 may provide alternative views or embodiments of primary data stream 304. Take, for example, a C++ source file used as source code for a C++ program. Primary data stream 304 may include only the raw text of the source file, in a format suitable for compilation by a compiler. Alternative data streams 312 may include the same source code in a markedup format, such as RTF, with syntax highlighting that illustrates the different elements of the source file. Thus, if the C++ source file is opened in a raw text file format or in a text editor, then only the raw text data are provided to the text editor. On the other hand, if the file is opened in an editor with RTF display capabilities, then the RTF markup with syntax highlighting may be displayed instead.

ADS 312 may also be used, in some embodiments, to provide more extensive attribute data than is generally provided by the file system attributes. For example, for files downloaded from the internet, the Zone.Identifier ADS provides information about which internet "zone" the file was downloaded from. If the file was downloaded from an untrusted zone, then additional security measures may be required when the user opens or executes the file. Because traditional file system attributes do not have sufficient data capabilities to provide all of the information in the Zone.Identifier file, the ADS can provide an extension to traditional file metadata. This extension of file metadata is useful not only for the operating system, but as discussed above, can also be used to identify an advertiser in an advertising campaign for purposes of remuneration.

Figure 4:
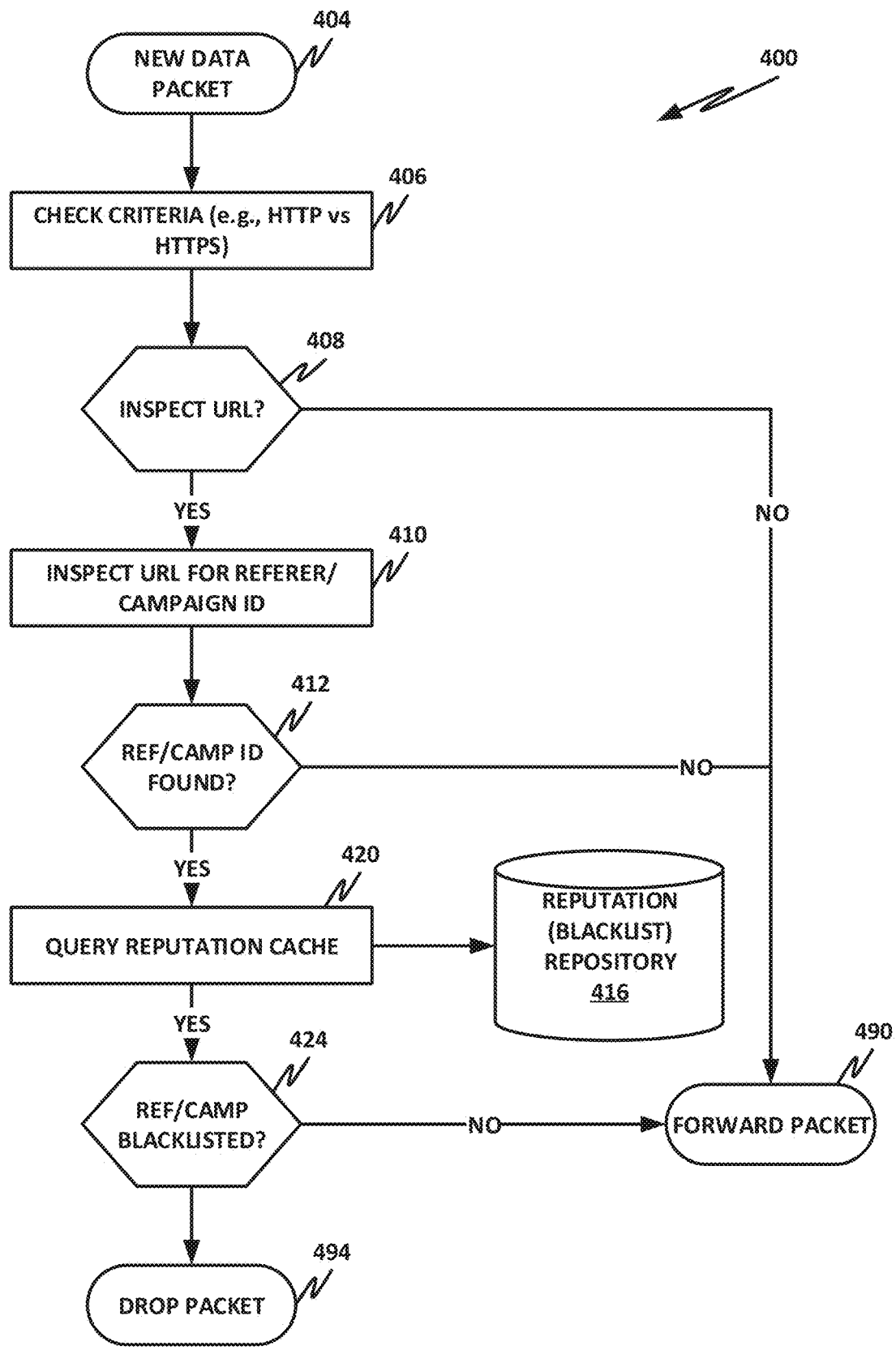
FIG. 4 is a flowchart of a method that may be used by a deceptive advertisement remediation engine.

FIG. 4 is a flowchart of a method 400. Method 400 may be used by a deceptive advertisement remediation engine to identify deceptive advertisements in flight. In some embodiments, method 400 may be implemented by an enterprise gateway, or some other enterprise network function. Method 400 may be performed via network function virtualization, such as on a virtual machine dedicated to performing the network function. In other embodiments, method 400 may be performed by a local security agent on a user's endpoint machine. In that case, if the endpoint machine does not operate within a virtual machine, then the instructions may be performed natively on the hardware.

Starting at block 404, the security function receives a new incoming data packet. The new incoming data packet could be an HTTP request, an HTTPS request, a substantive data packet, or some other data stream.

In block 406, the security function checks whether the incoming data packet meets certain criteria. For example, if the packet is a packet from the internet, then the security function may check whether the connection is an HTTP connection versus an HTTPS connection. If the connection is an HTTP connection, then the data stream may be subjected to additional verification. In an illustrative embodiment, packets that are not HTTPS are selected for verification via a deceptive advertisement remediation engine. In other embodiments, all packets are inspected before they are passed on to the network.

In decision block 408, the security function determines whether the URL should be inspected based on the criteria. If the URL is not to be inspected, then in block 490, the security function simply forwards the packet and takes no further action.

Returning to decision block 408, if the URL is to be inspected, then control passes to block 410.

In block 410, the security function inspects the URL for an appropriate token for assigning a reputation. In some embodiments, this is an advertiser identifier token, such as a referrer ID and/or a campaign ID. In various embodiments, a referrer ID could be used independently. This may be useful, because two different advertising campaigns are unlikely to assign the same referrer ID to different advertising partners. It is more common for each advertising campaign to select its own method for assigning referrer IDs. Thus, in at least some embodiments, the referrer ID uniquely identifies both the referrer and the advertising campaign, or does so nearly enough to be useful. In other embodiments, if an entire campaign is identified as being deceptive, then the campaign identifier may be assigned a deceptive reputation and blacklisted. In that case, all advertisements within that campaign are blocked, regardless of the referrer. In other embodiments, to achieve a more exact identification, a combination of referrer and campaign ID may be used. This uniquely identifies the combination of referrer and campaign, and that combination may be blacklisted if assigned a deceptive reputation.

In the instance where a referrer ID is used specifically, another benefit may be derived if an advertiser reuses the same referrer ID across multiple campaigns. For example, as the software vendor releases new versions of the software, it may implement new advertising campaigns, each with its own unique campaign ID. However, if that software vendor continues to contract with substantially the same group of advertisement vendors, it is possible that in at least some cases the software vendor will assign the same referrer ID to the same advertisement vendor. This may be useful if that referrer uses deceptive advertising practices across a plurality of advertisement campaigns. In that case, a deceptive reputation causing the referrer to be blacklisted can be applied across all of those campaigns, to ensure that deceptive advertisements do not get through, even when an advertising campaign is new.

In decision block 412, the security function determines whether a usable referrer and/or campaign identifier was found in the URL. As used throughout this specification and in the appended claims, a referrer identifier string may refer to a referrer or partner ID within a URL string, a campaign ID, or any combination of the two.

In decision block 412, if the referrer or campaign identifier is not found, then in block 490, the packet is forwarded and no additional action is taken.

Returning to decision block 412, if a referrer identification string is found within the URL, then in block 420, the security function queries a reputation cache such as reputation or blacklist repository 416. Reputation or blacklist repository 416 returns a reputation, if one is found, for the referrer identification string.

In decision block 424, the security function determines whether the referrer and/or campaign has been blacklisted according to reputation repository 416. If the reputation is not found or a non-blacklisted reputation is found, then in block 490, the security function forwards the packet.

Returning to decision block 424, if a negative, deceptive, or blacklisted reputation is found for the referrer and/or campaign ID, then in block 494, the security function may drop the packet.

Figure 5:
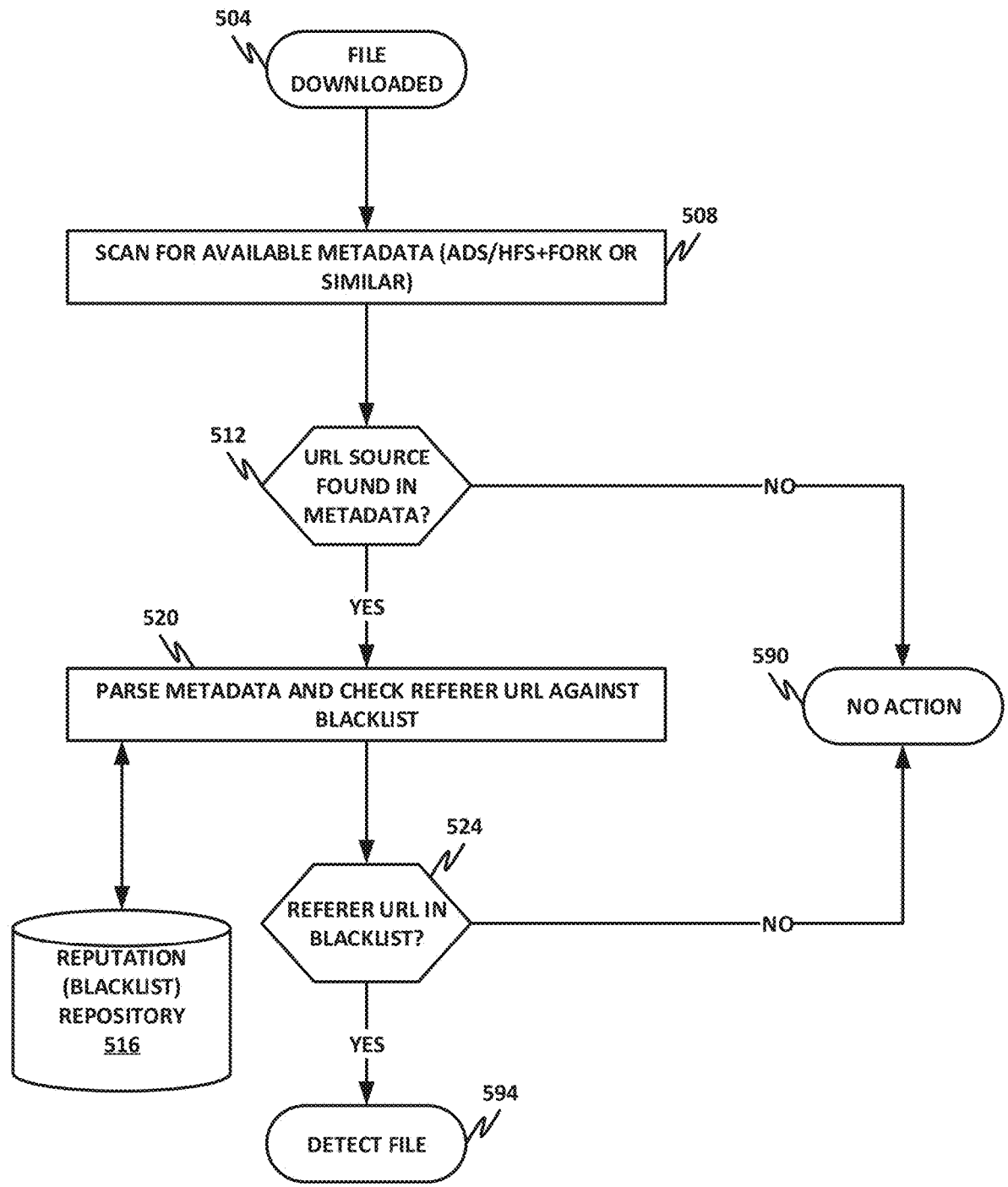
FIG. 5 is a flowchart of a method that may be performed in some embodiments on a user endpoint device.
Figure 6:
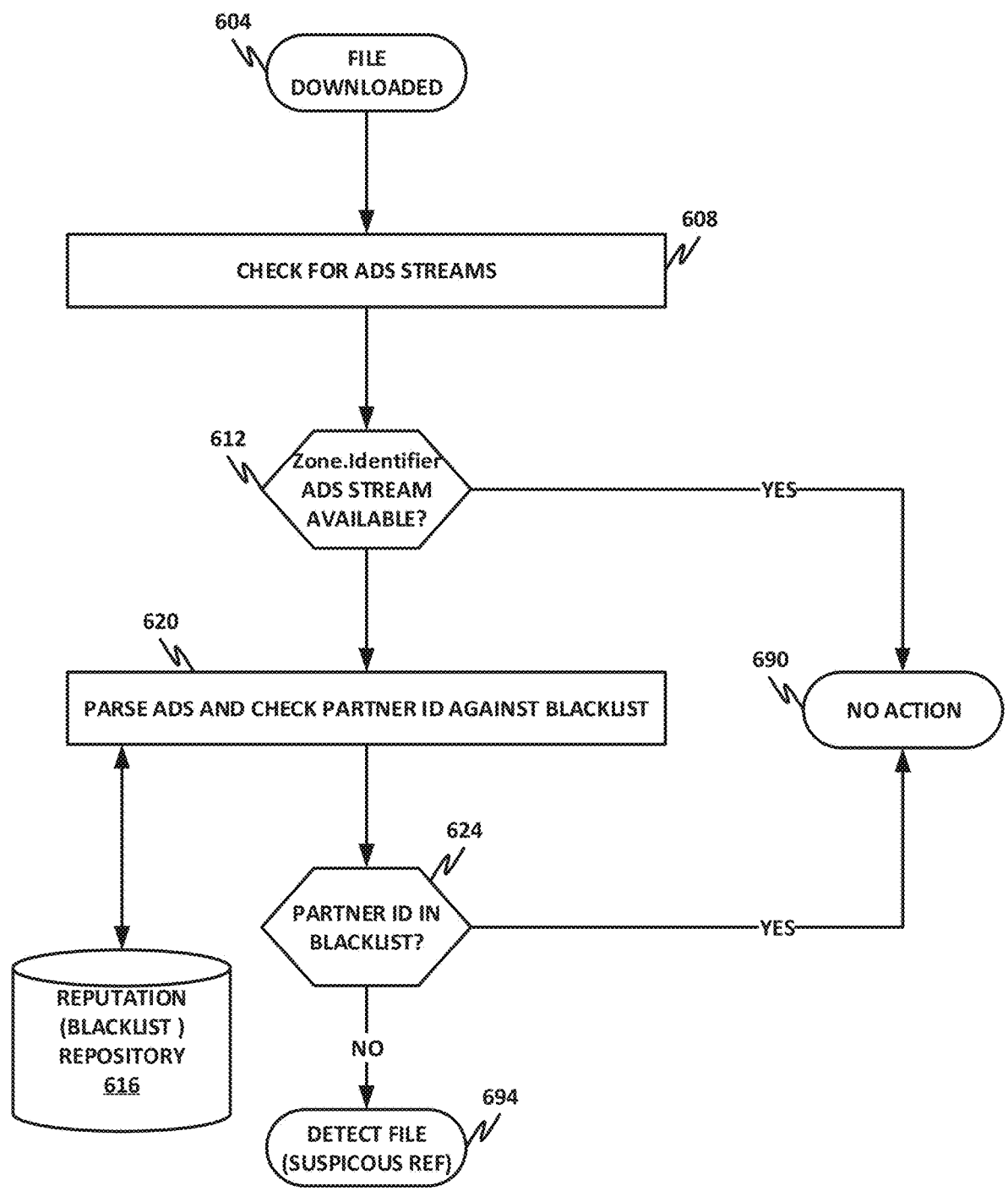
FIG. 6 is a flowchart of a method specific to Microsoft Windows NTFS.

FIG. 5 is a flowchart of a method 500. Method 500 may be performed in some embodiments on a user endpoint device, which could be a Windows, Macintosh, Linux, Unix, or other endpoint device. Method 500 may be performed in an illustrative example by a security agent on the endpoint device. Method 500 illustrates the method in an abstract sense, while method 600 of FIG. 6 illustrates an embodiment specific to a Windows operating system with an NTFS alternative data stream.

In block 504, the user downloads a file to the local endpoint device. When the file is downloaded, metadata may be applied to the download, and in some embodiments the metadata may include detailed metadata such as zone information, or other alternative data that is attached to or exists in parallel with the file.

In block 508, the endpoint device scans for the available metadata. This could be done by scanning the ADS, scanning for HFS+ fork data, or other similar data on a Unix, Linux, or other operating system.

In decision block 512, the local security agent determines whether a URL source was found in the metadata associated with the downloaded file.

If no URL source information was found, then in this embodiment there is no referrer and/or campaign ID, or other referrer identification string, to identify the advertising campaign or advertiser. Thus, in block 590, no action is taken.

Returning to decision block 512, if a URL source file is found in the metadata, then there is information for the security agent to work with.

In block 520, the security agent parses metadata and checks the referrer URL (or other advertiser identification string) against a blacklist or other reputation cache. For example, in this embodiment, the security agent queries reputation repository 516. Reputation repository 516 may be a local reputation repository, a global reputation repository, and/or an enterprise reputation repository. For example, a security services provider such as provider 190 of FIG. 1 may maintain a global reputation repository. If the security agent cannot find a cached reputation in the local security repository, then it may query the global repository to see if there is a globally assigned reputation for the object. If a global (or, in other embodiments, enterprise) reputation is found, then that reputation may be locally cached in a local cache of the repository.

Returning to block 520, the reputation (if found) is passed to decision block 524. In decision block 524, the security agent determines whether the URL was found in the blacklist or otherwise has a negative reputation.

If the URL is not found in the local, enterprise, or global blacklist repository, then the URL or the advertiser identification string is not blocked, and in block 590, no action is taken.

Returning to decision block 524, if the URL is found in the blacklist, then in block 594, a detect file event occurs. In response to the detect file event, the security agent or other operating system agent may take some appropriate action. For example, the file could be removed, blocked from executing, sandboxed, analyzed for malicious activity, or some other action could be taken. Note that eliminating the file may be useful, even if the download itself is not malicious or provides a useful utility. For example, even if the download provides a useful utility or program, when the advertiser receives compensation for the deceptive advertisement, this encourages the practice of deceptive advertisement. On the other hand, if the file is deleted so that it can't be installed, then the advertiser will receive no credit for the download, and this discourages deceptive advertisement practices. In yet another embodiment, the user may be permitted to keep the downloaded file and install it on the machine, but the metadata identifying the deceptive advertiser may be removed. In this case, even if the user installs the file on the local machine, the deceptive advertiser will not receive any compensation for the deceptive advertisement. This, again, discourages deceptive advertising practices.

FIG. 6 is a flowchart of a method 600. Method 600 may be performed in some embodiments on a user endpoint device, and is specific to a Windows operating system with an NTFS alternative data stream (ADS). Method 600 may be performed in an illustrative example by a Windows security agent on the endpoint device.

In block 604, the user downloads a file to the local endpoint device. When the file is downloaded, NTFS ADS metadata may be applied to the download, and in some embodiments the NTFS ADS metadata may include detailed metadata such as zone information, or other alternative data that is attached to or exists in parallel with the file.

In block 608, the endpoint device scans for the available metadata. This could be done by scanning the ADS, scanning for HFS+ fork data, or other similar data on a Windows NTFS operating system.

In decision block 612, the local Windows security agent determines whether a URL source was found in the NTFS ADS metadata associated with the downloaded file.

If no URL source information was found, then in this embodiment there is no referrer and/or campaign ID, or other referrer identification string, to identify the advertising campaign or advertiser. Thus, in block 690, no action is taken.

Returning to decision block 612, if a URL source file is found in the NTFS ADS metadata, then there is information for the security agent to work with.

In block 620, the Windows security agent parses metadata and checks the referrer URL (or other advertiser identification string) against a blacklist or other reputation cache. For example, in this embodiment, the Windows security agent queries reputation repository 616. Reputation repository 616 may be a local reputation repository, a global reputation repository, and/or an enterprise reputation repository. For example, a security services provider such as provider 190 of FIG. 1 may maintain a global reputation repository. If the Windows security agent cannot find a cached reputation in the local security repository, then it may query the global repository to see if there is a globally assigned reputation for the object. If a global (or, in other embodiments, enterprise) reputation is found, then that reputation may be locally cached in a local cache of the repository.

Returning to block 620, the reputation (if found) is passed to decision block 624. In decision block 624, the Windows security agent determines whether the URL was found in the blacklist or otherwise has a negative reputation.

If the URL is not found in the local, enterprise, or global blacklist repository, then the URL or the advertiser identification string is not blocked, and in block 690, no action is taken.

Returning to decision block 624, if the URL is found in the blacklist, then in block 694, a detect file event occurs. In response to the detect file event, the Windows security agent may take some appropriate action. For example, the file could be removed, blocked from executing, sandboxed, analyzed for malicious activity, or some other action could be taken. Note that eliminating the file may be useful, even if the download itself is not malicious or provides a useful utility. For example, even if the download provides a useful utility or program, when the advertiser receives compensation for the deceptive advertisement, this encourages the practice of deceptive advertisement. On the other hand, if the file is deleted so that it can't be installed, then the advertiser will receive no credit for the download, and this discourages deceptive advertisement practices. In yet another embodiment, the user may be permitted to keep the downloaded file and install it on the machine, but the NTFS ADS metadata identifying the deceptive advertiser may be removed. In this case, even if the user installs the file on the local machine, the deceptive advertiser will not receive any compensation for the deceptive advertisement. This, again, discourages deceptive advertising practices.

Figure 7:
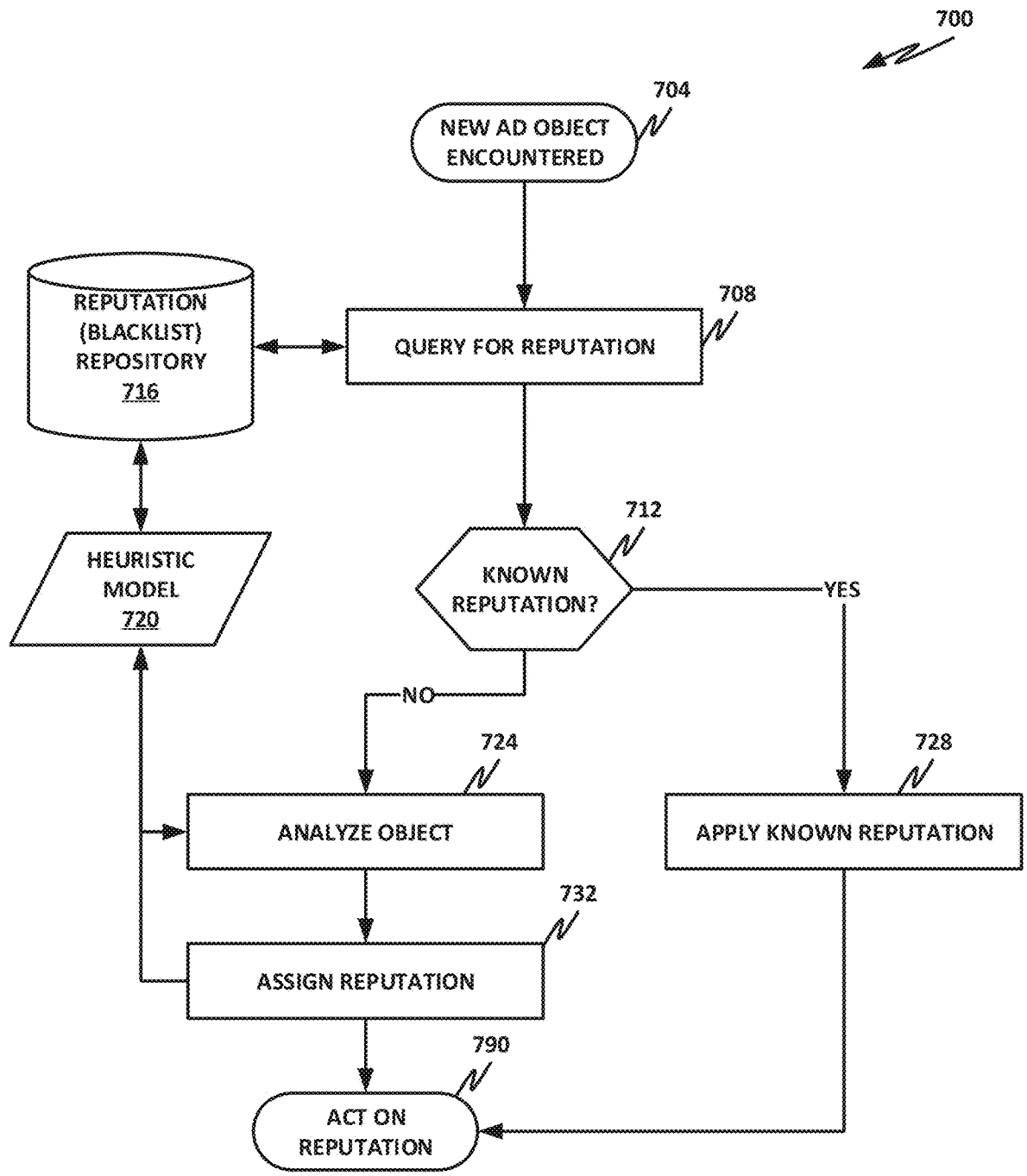
FIG. 7 is a flowchart of a method that may be used to identify deceptive advertising practices.

FIG. 7 is a flowchart of a method 700. Method 700 may be used to identify deceptive advertising practices, and to assign deceptive reputations to deceptive advertisers.

Method 700 may be performed by a local security agent running on the endpoint, by a security function running in the cloud, or by a combination of the two.

Starting in block 704, a new advertising object is encountered.

In block 708, the security agent queries a reputation repository 716 for a reputation for the advertising object.

In decision block 712, the security agent determines whether the advertising object has a known reputation. If it has a known reputation, then there is no need to apply behavioral or heuristic models to compute a new reputation. Instead, in block 728, the known reputation is simply applied to the object, and in block 790, the security agent and/or the operating system can act on that reputation, accordingly.

Returning to decision block 712, if the object does not have a known reputation, then it may be desirable to compute a new reputation for the object.

In block 724, the security agent analyzes the object to determine whether it exhibits the characteristics of deceptive advertising. Analyzing the object in block 724 may include querying a heuristic model 720, as well as a reputation repository 716. This may be done to determine whether the advertisement exhibits behavior similar to other known deceptive advertisements.

In block 732, once the object has been analyzed, the security agent assigns the object a new reputation according to a heuristic or behavioral model, or other factors. That reputation can then be provided to reputation repository 716.

In block 790, the security agent or other operating system agents may act on the reputation accordingly.

Figure 8:
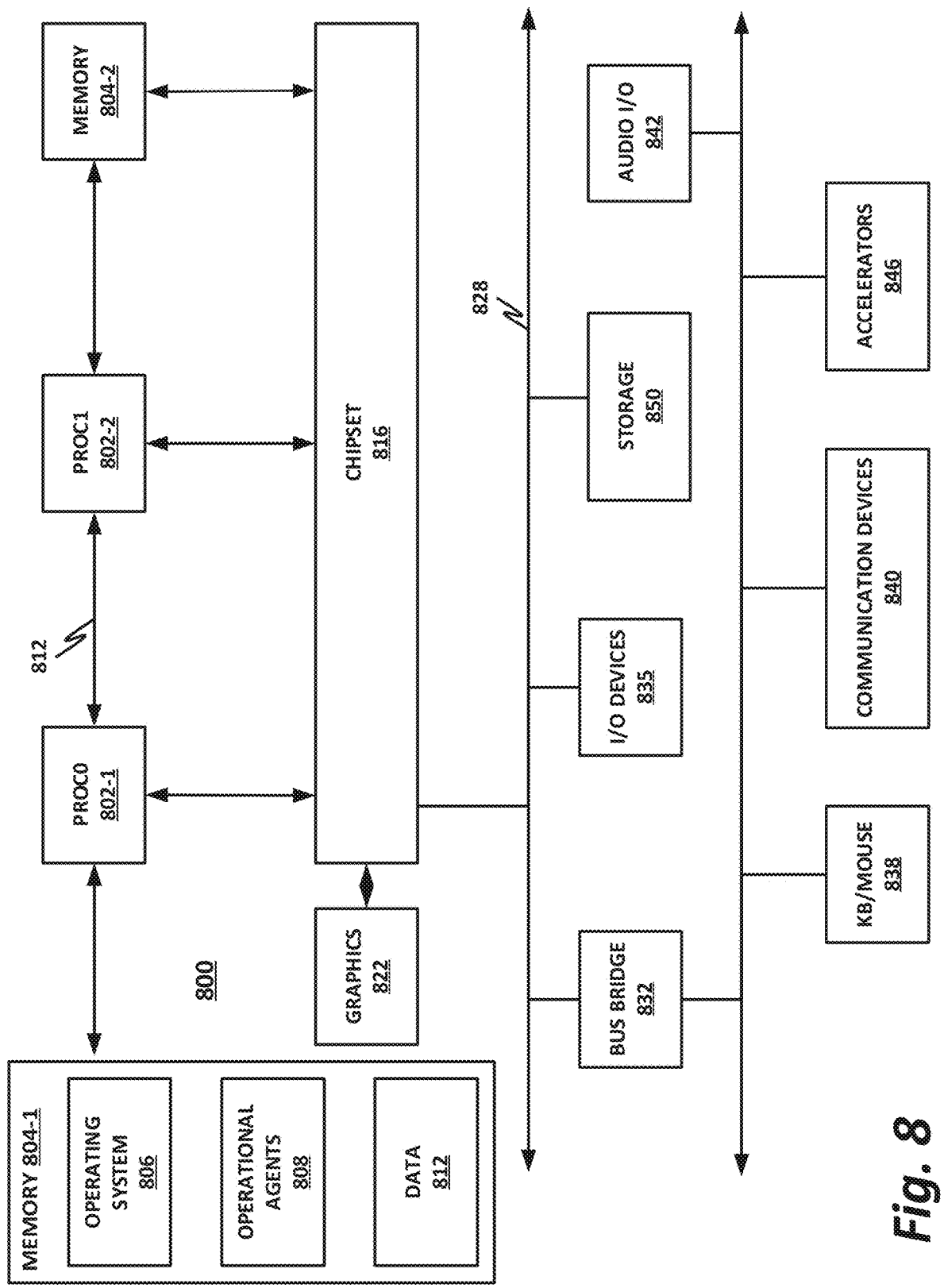
FIG. 8 is a block diagram of selected elements of a hardware platform.

FIG. 8 is a block diagram of a hardware platform 800. Embodiments of hardware platform 800 may be configured or adapted for providing mitigation of deceptive advertisements, as disclosed in the present specification.

Although a particular configuration is illustrated here, there are many different configurations of hardware platforms, and this embodiment is intended to represent the class of hardware platforms that can provide a computing device. Furthermore, the designation of this embodiment as a "hardware platform" is not intended to require that all embodiments provide all elements in hardware. Some of the elements disclosed herein may be provided, in various embodiments, as hardware, software, firmware, microcode, microcode instructions, hardware instructions, hardware or software accelerators, or similar. Furthermore, in some embodiments, entire computing devices or platforms may be virtualized, on a single device, or in a data center where virtualization may span one or a plurality of devices. For example, in a "rackscale architecture" design, disaggregated computing resources may be virtualized into a single instance of a virtual device. In that case, all of the disaggregated resources that are used to build the virtual device may be considered part of hardware platform 800, even though they may be scattered across a data center, or even located in different data centers.

Hardware platform 800 is configured to provide a computing device. In various embodiments, a "computing device" may be or comprise, by way of nonlimiting example, a computer, workstation, server, mainframe, virtual machine (whether emulated or on a "bare metal" hypervisor), network appliance, container, IoT device, high performance computing (HPC) environment, a data center, a communications service provider infrastructure (e.g., one or more portions of an Evolved Packet Core), an in-memory computing environment, a computing system of a vehicle (e.g., an automobile or airplane), an industrial control system, embedded computer, embedded controller, embedded sensor, personal digital assistant, laptop computer, cellular telephone, internet protocol telephone, smart phone, tablet computer, convertible tablet computer, computing appliance, receiver, wearable computer, handheld calculator, or any other electronic, microelectronic, or microelectromechanical device for processing and communicating data. At least some of the methods and systems disclosed in this specification may be embodied by or carried out on a computing device.

In the illustrated example, hardware platform 800 is arranged in a point-to-point (PtP) configuration. This PtP configuration is popular for personal computer (PC) and server-type devices, although it is not so limited, and any other bus type may be used.

Hardware platform 800 is an example of a platform that may be used to implement embodiments of the teachings of this specification. For example, instructions could be stored in storage 850. Instructions could also be transmitted to the hardware platform in an ethereal form, such as via network interface 848, or retrieved from another source via any suitable interconnect. Once received (from any source), the instructions may be loaded into memory 804, and may then be executed by one or more processor 802 to provide elements such as an operating system 806, operational agents 808, or data 812.

Figure 10:
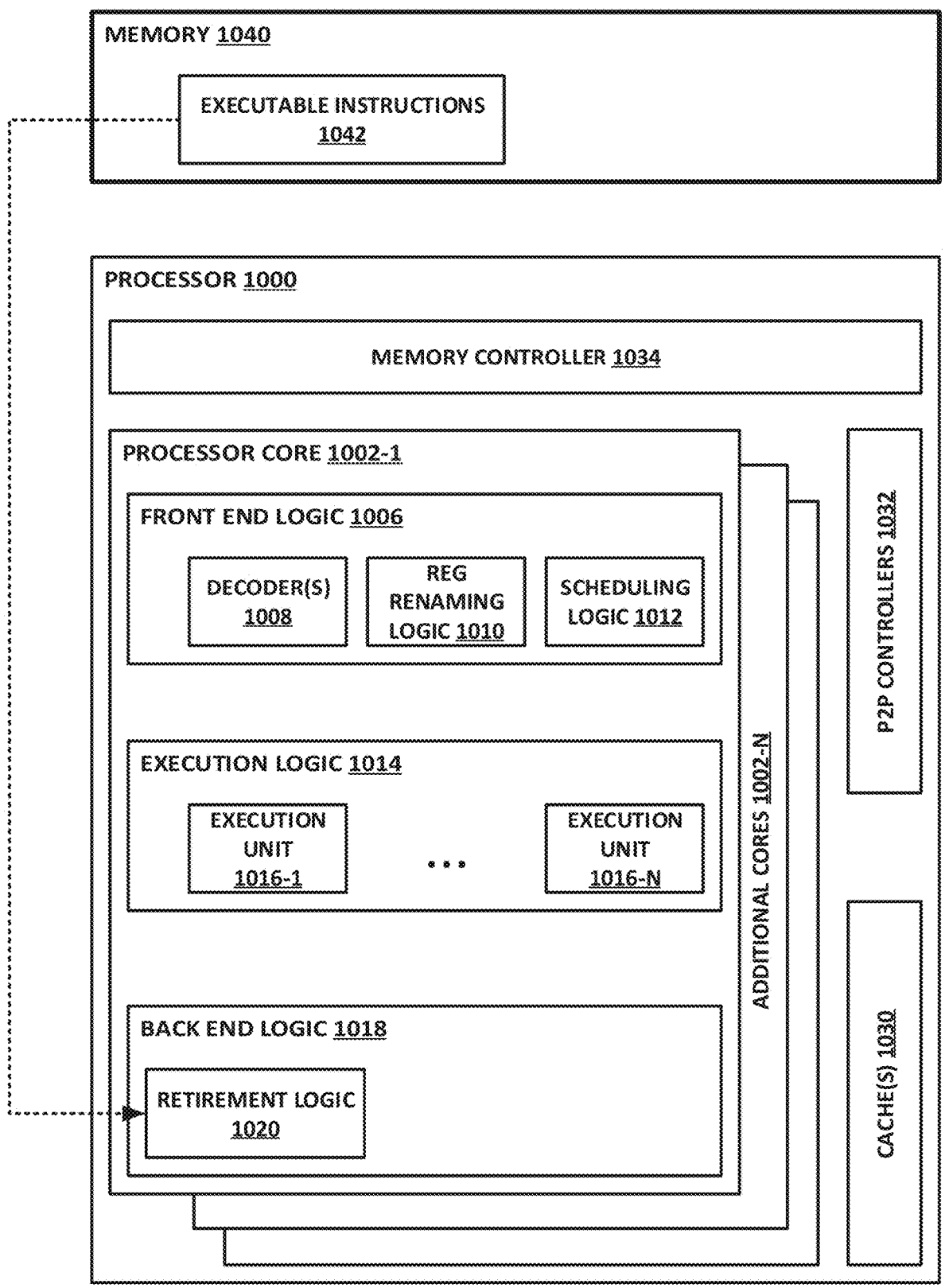
FIG. 10 is a block diagram of selected elements of a processor.

Hardware platform 800 may include several processors 802. For simplicity and clarity, only processors PROC0 802-1 and PROC1 802-2 are shown. Additional processors (such as 2, 4, 8, 16, 24, 32, 64, or 128 processors) may be provided as necessary, while in other embodiments, only one processor may be provided. Details of processors 802 are not illustrated in this FIGURE, but one embodiment is illustrated in FIG. 10. Processors may have any number of cores, such as 1, 2, 4, 8, 16, 24, 32, 64, or 128 cores.

Processors 802 may be any type of processor and may communicatively couple to chipset 816 via, for example, PtP interfaces. Chipset 816 may also exchange data with other elements, such as a high performance graphics adapter 822. In alternative embodiments, any or all of the PtP links illustrated in FIG. 8 could be implemented as any type of bus, or other configuration rather than a PtP link. In various embodiments, chipset 816 may reside on the same die or package as a central processing unit (CPU) 1112 or on one or more different dies or packages. Each chipset may support any suitable number of CPUs 802. A chipset 816 (which may be a chipset, uncore, Northbridge, Southbridge, or other suitable logic and circuitry) may also include one or more controllers to couple other components to one or more CPUs.

Two memories, 804-1 and 804-2 are shown, connected to PROC0 802-1 and PROC1 802-2, respectively. As an example, each processor is shown connected to its memory in a direct memory access (DMA) configuration, though other memory architectures are possible, including ones in which memory 804 communicates with processor 810 via a bus. For example, some memories may be connected via a system bus, or in a data center, memory may be accessible in a remote DMA (RDMA) configuration.

Memory 804 may include any form of volatile or nonvolatile memory including, without limitation, magnetic media (e.g., one or more tape drives), optical media, flash, random access memory (RAM), double data rate RAM (DDR RAM) nonvolatile RAM (NVRAM), static RAM (SRAM), dynamic RAM (DRAM), persistent RAM (PRAM), data-centric (DC) persistent memory (e.g., Intel® Optane/3D-crosspoint), cache, Layer 1 (L1) or Layer 2 (L2)

memory, on-chip memory, registers, virtual memory region, read-only memory (ROM), flash memory, removable media, tape drive, cloud storage, or any other suitable local or remote memory component or components. Memory 804 may be used for short, medium, and/or long-term storage. Memory 804 may store any suitable data or information utilized by platform logic. In some embodiments, memory 804 may also comprise storage for instructions that may be executed by the cores of CPUs 802 or other processing elements (e.g., logic resident on chipsets 816) to provide functionality.

In certain embodiments, memory 804 may comprise a relatively low-latency volatile main memory, while storage 850 may comprise a relatively higher-latency nonvolatile memory. However, memory 804 and storage 850 need not be physically separate devices, and in some examples may represent simply a logical separation of function (if there is any separation at all). It should also be noted that although DMA is disclosed by way of nonlimiting example, DMA is not the only protocol consistent with this specification, and that other memory architectures are available.

Certain computing devices provide main memory 804 and storage 850, for example, in a single physical memory device, and in other cases, memory 804 and/or storage 850 are functionally distributed across many physical devices. In the case of virtual machines or hypervisors, all or part of a function may be provided in the form of software or firmware running over a virtualization layer to provide the logical function, and resources such as memory, storage, and accelerators may be disaggregated (i.e., located in different physical locations across a data center). In other examples, a device such as a network interface may provide only the minimum hardware interfaces necessary to perform its logical operation, and may rely on a software driver to provide additional necessary logic. Thus, each logical block disclosed herein is broadly intended to include one or more logic elements configured and operable for providing the disclosed logical operation of that block. As used throughout this specification, "logic elements" may include hardware, external hardware (digital, analog, or mixed-signal), software, reciprocating software, services, drivers, interfaces, components, modules, algorithms, sensors, components, firmware, hardware instructions, microcode, programmable logic, or objects that can coordinate to achieve a logical operation.

Graphics adapter 822 may be configured to provide a human-readable visual output, such as a command-line interface (CLI) or graphical desktop such as Microsoft Windows, Apple OSX desktop, or a Unix/Linux X Window System-based desktop. Graphics adapter 822 may provide output in any suitable format, such as a coaxial output, composite video, component video, video graphics array (VGA), or digital outputs such as digital visual interface (DVI), FPDLink, DisplayPort, or high definition multimedia interface (HDMI), by way of nonlimiting example. In some examples, graphics adapter 822 may include a hardware graphics card, which may have its own memory and its own graphics processing unit (GPU).

Chipset 816 may be in communication with a bus 828 via an interface circuit. Bus 828 may have one or more devices that communicate over it, such as a bus bridge 832, I/O devices 835, network interface 848, accelerators 846, communication devices 840, and a keyboard and/or mouse 838, by way of nonlimiting example. In general terms, the elements of hardware platform 800 may be coupled together in any suitable manner. For example, a bus may couple any of the components together. A bus may include any known interconnect, such as a multi-drop bus, a mesh interconnect, a fabric, a ring interconnect, a round-robin protocol, a PtP interconnect, a serial interconnect, a parallel bus, a coherent (e.g., cache coherent) bus, a layered protocol architecture, a differential bus, or a Gunning transceiver logic (GTL) bus, by way of illustrative and nonlimiting example.

Communication devices 840 can broadly include any communication not covered by network interface 848 and the various I/O devices described herein. This may include, for example, various universal serial bus (USB), FireWire, Lightning, or other serial or parallel devices that provide communications.

I/O Devices 835 may be configured to interface with any auxiliary device that connects to hardware platform 800 but that is not necessarily a part of the core architecture of hardware platform 800. A peripheral may be operable to provide extended functionality to hardware platform 800, and may or may not be wholly dependent on hardware platform 800. In some cases, a peripheral may be a computing device in its own right. Peripherals may include input and output devices such as displays, terminals, printers, keyboards, mice, modems, data ports (e.g., serial, parallel, USB, Firewire, or similar), network controllers, optical media, external storage, sensors, transducers, actuators, controllers, data acquisition buses, cameras, microphones, speakers, or external storage, by way of nonlimiting example.

In one example, audio I/O 842 may provide an interface for audible sounds, and may include in some examples a hardware sound card. Sound output may be provided in analog (such as a 3.5 mm stereo jack), component ("RCA") stereo, or in a digital audio format such as S/PDIF, AES3, AES47, HDMI, USB, Bluetooth, or Wi-Fi audio, by way of nonlimiting example. Audio input may also be provided via similar interfaces, in an analog or digital form.

Bus bridge 832 may be in communication with other devices such as a keyboard/mouse 838 (or other input devices such as a touch screen, trackball, etc.), communication devices 840 (such as modems, network interface devices, peripheral interfaces such as PCI or PCIe, or other types of communication devices that may communicate through a network), audio I/O devices 842, a data storage device 844, and/or accelerators 846. In alternative embodiments, any portions of the bus architectures could be implemented with one or more PtP links.

Operating system 806 may be, for example, Microsoft Windows, Linux, UNIX, Mac OS X, iOS, MS-DOS, or an embedded or real-time operating system (including embedded or real-time flavors of the foregoing). In some embodiments, a hardware platform 800 may function as a host platform for one or more guest systems that invoke application (e.g., operational agents 808).

Operational agents 808 may include one or more computing engines that may include one or more non-transitory computer-readable mediums having stored thereon executable instructions operable to instruct a processor to provide operational functions. At an appropriate time, such as upon booting hardware platform 800 or upon a command from operating system 806 or a user or security administrator, processor 802 may retrieve a copy of the operational agent (or software portions thereof) from storage 850 and load it into memory 804. Processor 810 may then iteratively execute the instructions of operational agents 808 to provide the desired methods or functions.

As used throughout this specification, an "engine" includes any combination of one or more logic elements, of similar or dissimilar species, operable for and configured to perform one or more methods provided by the engine. In some cases, the engine may be or include a special integrated circuit designed to carry out a method or a part thereof, a field-programmable gate array (FPGA) programmed to provide a function, a special hardware or microcode instruction, other programmable logic, and/or software instructions operable to instruct a processor to perform the method. In some cases, the engine may run as a "daemon" process, background process, terminate-and-stay-resident program, a service, system extension, control panel, bootup procedure, basic in/output system (BIOS) subroutine, or any similar program that operates with or without direct user interaction. In certain embodiments, some engines may run with elevated privileges in a "driver space" associated with ring 0, 1, or 2 in a protection ring architecture. The engine may also include other hardware, software, and/or data, including configuration files, registry entries, application programming interfaces (APIs), and interactive or user-mode software by way of nonlimiting example.

Where elements of an engine are embodied in software, computer program instructions may be implemented in programming languages, such as an object code, an assembly language, or a high-level language such as OpenCL, FORTRAN, C, C++, JAVA, or HTML. These may be used with any compatible operating systems or operating environments. Hardware elements may be designed manually, or with a hardware description language such as Spice, Verilog, and VHDL. The source code may define and use various data structures and communication messages. The source code may be in a computer executable form (e.g., via an interpreter), or the source code may be converted (e.g., via a translator, assembler, or compiler) into a computer executable form, or converted to an intermediate form such as byte code. Where appropriate, any of the foregoing may be used to build or describe appropriate discrete or integrated circuits, whether sequential, combinatorial, state machines, or otherwise.

A network interface may be provided to communicatively couple hardware platform 800 to a wired or wireless network or fabric. A "network," as used throughout this specification, may include any communicative platform operable to exchange data or information within or between computing devices, including, by way of nonlimiting example, a local network, a switching fabric, an ad-hoc local network, Ethernet (e.g., as defined by the IEEE 802.3 standard), Fibre Channel, InfiniBand, Wi-Fi, or other suitable standard. Intel® Omni-Path™ Architecture (OPA), TrueScale™, Ultra Path Interconnect (UPI) (formerly called QPI or KTI), FibreChannel, Ethernet, FibreChannel over Ethernet (FCoE), InfiniBand, PCI, PCIe, fiber optics, millimeter wave guide, an internet architecture, a packet data network (PDN) offering a communications interface or exchange between any two nodes in a system, a local area network (LAN), metropolitan area network (MAN), wide area network (WAN), wireless local area network (WLAN), virtual private network (VPN), intranet, plain old telephone system (POTS), or any other appropriate architecture or system that facilitates communications in a network or telephonic environment, either with or without human interaction or intervention. Network interface 848 may include one or more physical ports that may couple to a cable (e.g., an Ethernet cable, other cable, or waveguide).

In some cases, some or all of the components of hardware platform 800 may be virtualized, in particular the processor(s) and memory. For example, a virtualized environment may run on OS 806, or OS 806 could be replaced with a hypervisor or virtual machine manager. In this configuration, a virtual machine running on hardware platform 800 may virtualize workloads. A virtual machine in this configuration may perform essentially all of the functions of a physical hardware platform.

In a general sense, any suitably-configured processor can execute any type of instructions associated with the data to achieve the operations illustrated in this specification. Any of the processors or cores disclosed herein could transform an element or an article (for example, data) from one state or thing to another state or thing. In another example, some activities outlined herein may be implemented with fixed logic or programmable logic (for example, software and/or computer instructions executed by a processor).

Various components of the system depicted in FIG. 8 may be combined in a system-on-a-chip (SoC) architecture or in any other suitable configuration. For example, embodiments disclosed herein can be incorporated into systems including mobile devices such as smart cellular telephones, tablet computers, personal digital assistants, portable gaming devices, and similar. These mobile devices may be provided with SoC architectures in at least some embodiments. An example of such an embodiment is provided in FIG. 9. Such an SoC (and any other hardware platform disclosed herein) may include analog, digital, and/or mixed-signal, radio frequency (RF), or similar processing elements. Other embodiments may include a multichip module (MCM), with a plurality of chips located within a single electronic package and configured to interact closely with each other through the electronic package. In various other embodiments, the computing functionalities disclosed herein may be implemented in one or more silicon cores in application-specific integrated circuits (ASICs), FPGAs, and other semiconductor chips.

Figure 9:
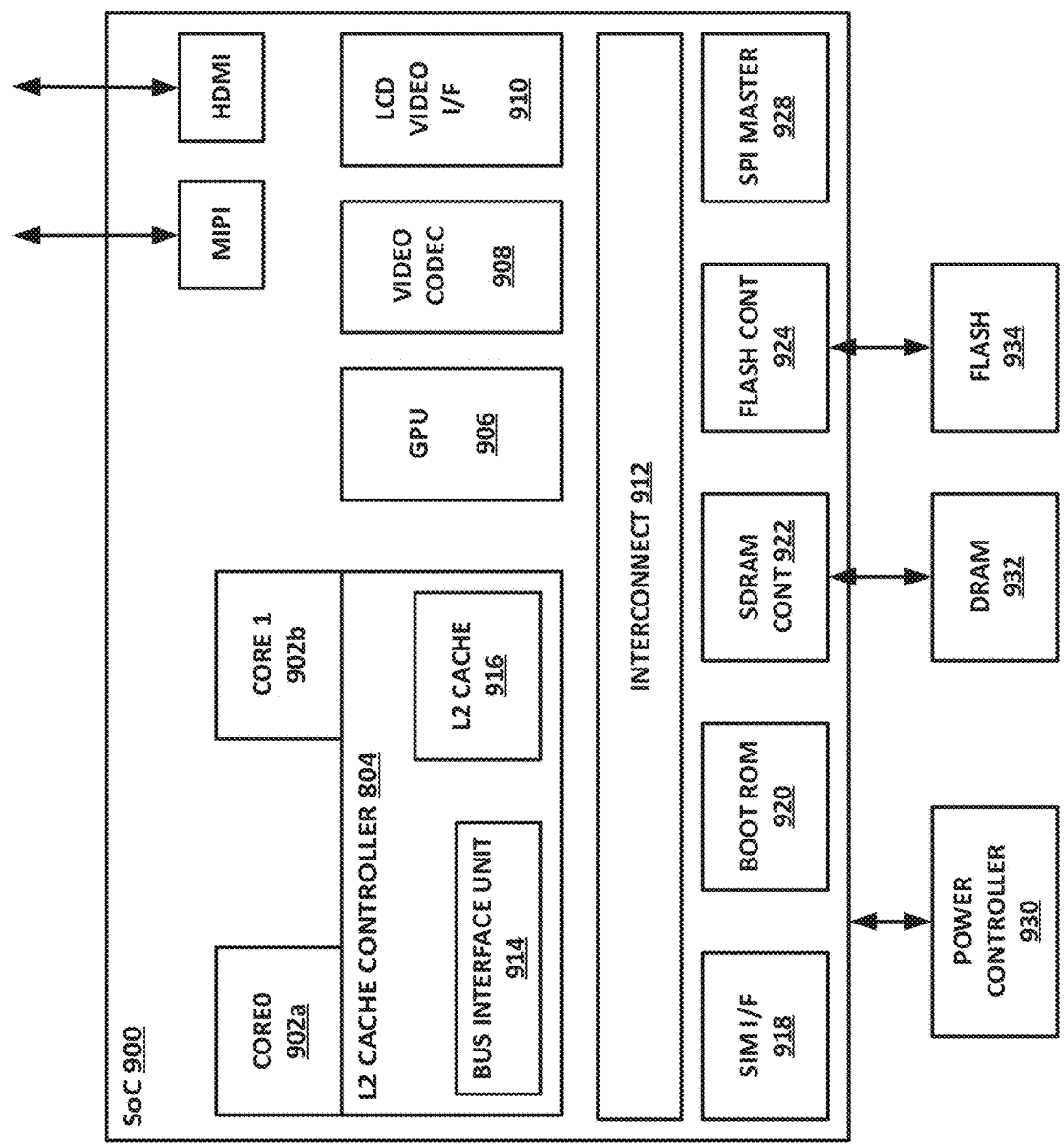
FIG. 9 is a block diagram of selected elements of a system-on-a-chip (SoC).

FIG. 9 is a block illustrating selected elements of an example SoC 900. Embodiments of SoC 900 may be configured or adapted for providing mitigation of deceptive advertisements, as disclosed in the present specification.

At least some of the teachings of the present specification may be embodied on an SoC 900, or may be paired with an SoC 900. SoC 900 may include, or may be paired with, an advanced reduced instruction set computer machine (ARM) component. For example, SoC 900 may include or be paired with any ARM core, such as A-9, A-15, or similar. This architecture represents a hardware platform that may be useful in devices such as tablets and smartphones, by way of illustrative example, including Android phones or tablets, iPhone (of any version), iPad, Google Nexus, Microsoft Surface. SoC 900 could also be integrated into, for example, a personal computer, server, video processing components, laptop computer, notebook computer, netbook, or touch-enabled device.

As with hardware platform 800 above, SoC 900 may include multiple cores 902a and 902b. In this illustrative example, SoC 900 also includes an L2 cache control 904, a GPU 906, a video codec 908, a liquid crystal display (LCD) I/F 910 and an interconnect 912. L2 cache control 904 can include a bus interface unit 914, a L2 cache 916. Liquid crystal display (LCD) I/F 910 may be associated with mobile industry processor interface (MIPI)/HDMI links that couple to an LCD.

SoC 900 may also include a subscriber identity module (SIM) I/F 918, a boot ROM 920, a synchronous dynamic random access memory (SDRAM) controller 922, a flash controller 924, a serial peripheral interface (SPI) master 928, a suitable power control 930, a dynamic RAM (DRAM) 932, and flash 934. In addition, one or more embodiments include one or more communication capabilities, interfaces, and features such as instances of Bluetooth™ 936, a 3G modem 938, a global positioning system (GPS) 940, and an 802.11 Wi-Fi 942.

Designers of integrated circuits such as SoC 900 (or other integrated circuits) may use intellectual property (IP) blocks to simplify system design. An IP block is a modular, self-contained hardware block that can be easily integrated into the design. Because the IP block is modular and self-contained, the integrated circuit (IC) designer need only "drop in" the IP block to use the functionality of the IP block. The system designer can then make the appropriate connections to inputs and outputs.

IP blocks are often "black boxes." In other words, the system integrator using the IP block may not know, and need not know, the specific implementation details of the IP block. Indeed, IP blocks may be provided as proprietary third-party units, with no insight into the design of the IP block by the system integrator.

For example, a system integrator designing an SoC for a smart phone may use IP blocks in addition to the processor core, such as a memory controller, a nonvolatile memory (NVM) controller, Wi-Fi, Bluetooth, GPS, a fourth or fifth-generation network (4G or 5G), an audio processor, a video processor, an image processor, a graphics engine, a GPU engine, a security controller, and many other IP blocks. In many cases, each of these IP blocks has its own embedded microcontroller.

FIG. 10 is a block diagram illustrating selected elements of a processor 1000. Embodiments of processor 1000 may be configured or adapted for providing mitigation of deceptive advertisements, as disclosed in the present specification.

In various examples, and throughout this specification and the appended claims, a "processor" may include any combination of logic elements operable to execute instructions, whether loaded from memory, or implemented directly in hardware, including, by way of nonlimiting example, a microprocessor, microcontroller, CPU, advanced RISC (reduced instruction-set computing) machine (ARM), digital signal processor (DSP), FPGA, GPU, programmable logic array, ASIC, or virtual machine processor. In certain architectures, a multi-core processor may be provided, having for example, 2, 4, 8, 12, 16, 24, 32, 64, or 128 cores. In some embodiments, one or more co-processors or accelerators (hardware or software) may also be provided for specialized or support functions. In general, processor 1000 may include any number of processing elements, which may be symmetrical or asymmetrical.

Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core may refer to logic located on an integrated circuit capable of maintaining an independent architectural state, wherein each independently maintained architectural state is associated with at least some dedicated execution resources. A hardware thread may refer to any logic located on an integrated circuit capable of maintaining an independent architectural state, wherein the independently maintained architectural states share access to execution resources. A physical CPU may include any suitable number of cores. In various embodiments, cores may include one or more out-of-order processor cores or one or more in-order processor cores. However, cores may be individually selected from any type of core, such as a native core, a software managed core, a core adapted to execute a native instruction set architecture (ISA), a core adapted to execute a translated ISA, a co-designed core, or other known core. In a heterogeneous core environment (i.e. asymmetric cores), some form of translation, such as binary translation, may be utilized to schedule or execute code on one or both cores.

Processor 1000 includes one or more processor cores 1002, including core 1002-1-1002-N. Cores 1002 may be, as appropriate, single-thread cores or multi-thread cores. In multithreaded cores, more than one hardware thread may be provided at a time, and the core may therefore provide more than one logical core per physical core. The cores may be configured to execute instruction code. Each processor 1000 may include at least one shared cache 1030, which may be treated logically as part of memory 1040. Caches 1030 may be filled according to known caching techniques, and may store instructions and/or data that may be used by one or more components of processor 1000.

Processor 1000 may include an integrated memory controller (MC) 1034, to communicate with memory 1040. Memory controller 1034 may include logic and circuitry to interface with memory 1040, and may also include a cache controller to handle filling and evicting instructions and data to and from cache 1030.

By way of example, each core 1002 may include front-end logic 1006, execution logic 1014, and backend logic 1018.

In the illustrated embodiment, front-end logic 1006 includes an instruction decoder or decoders 1008, register renaming logic 1010, and scheduling logic 1012. Decoder 1008 may decode instructions received. Register renaming logic 1010 may provide register renaming, for example to facilitate pipelining. Scheduling logic 1012 may schedule instruction execution, and may provide out-of-order (OOO) execution. Front-end logic 1006 may fetch incoming instructions, perform various processing (e.g., caching, decoding, branch predicting, etc.), and pass instructions to execution logic 1014.

Execution logic 1014 includes one or more execution units 1016-1-1016-N. Execution units 1016 may include hardware instructions and microcode to carry out the provided instructions.

Backend logic 1018 includes retirement logic 1020. Core 1002 may provide for speculative execution of instructions, branch prediction, and similar. Retirement logic 1020 may be configured to determine which predicted instructions were actually needed by the program flow.

Processor 1000 may also include a PtP controller 1032, which enables connection to an uncore, chipset, Northbridge, Southbridge, or bus, by way of example.

Figure 11:
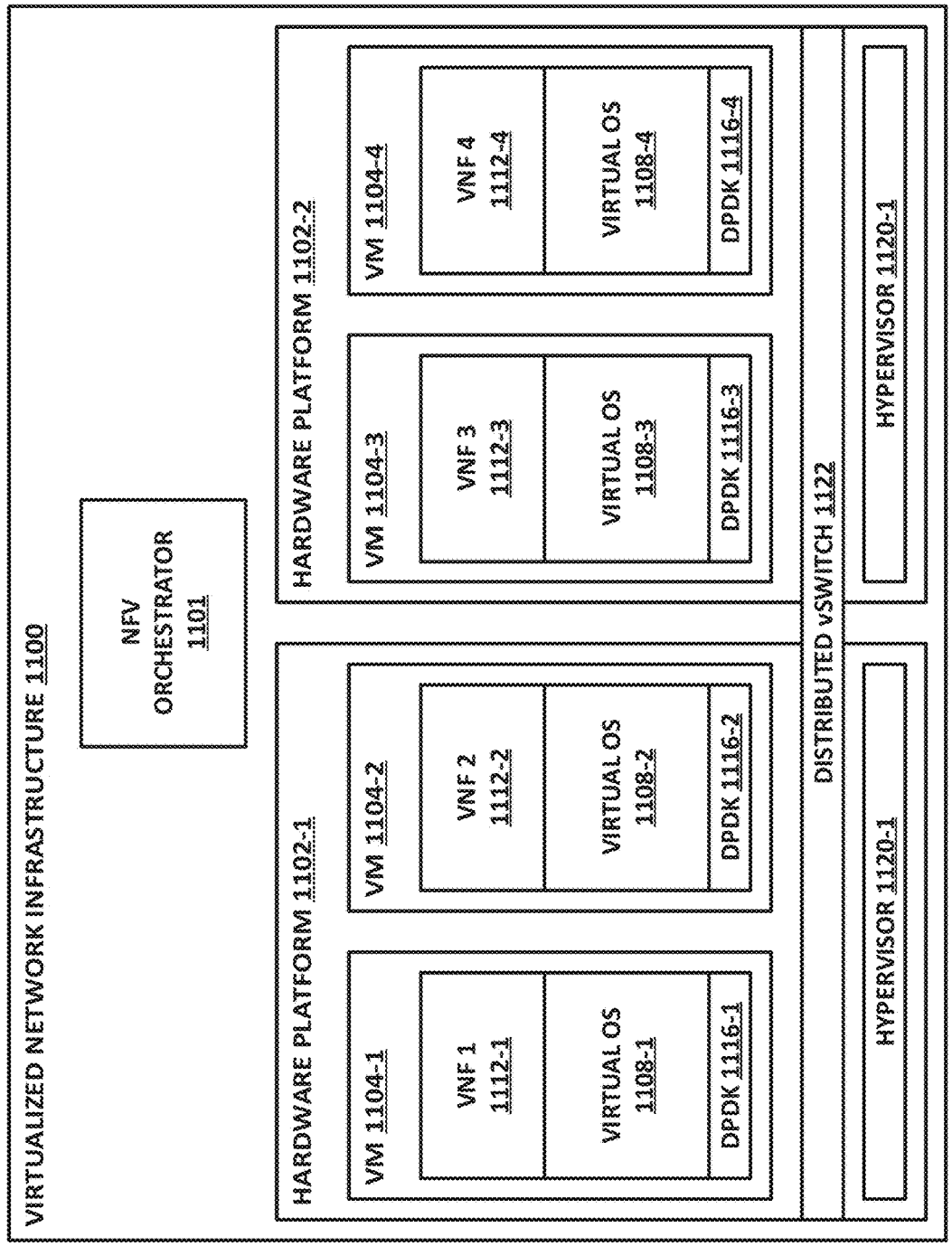
FIG. 11 is a block diagram of selected elements of a network function virtualization (NFV) infrastructure.

FIG. 11 is a block diagram of a network function virtualization (NFV) infrastructure 1100. Embodiments of NFV infrastructure 1100 may be configured or adapted for providing mitigation of deceptive advertisements, as disclosed in the present specification.

NFV is an aspect of network virtualization that is generally considered distinct from, but that can still interoperate with, a software defined network (SDN). For example, virtual network functions (VNFs) may operate within the data plane of an SDN deployment. NFV was originally envisioned as a method for providing reduced capital expenditure (Capex) and operating expenses (Opex) for telecommunication services. One feature of NFV is replacing proprietary, special-purpose hardware appliances with virtual appliances running on commercial off-the-shelf (COTS) hardware within a virtualized environment. In addition to Capex and Opex savings, NFV provides a more agile and adaptable network. As network loads change, VNFs can be provisioned ("spun up") or removed ("spun down") to meet network demands. For example, in times of high load, more load balancing VNFs may be spun up to distribute traffic to more workload servers (which may themselves be virtual machines). In times when more suspicious traffic is experienced, additional firewalls or deep packet inspection (DPI) appliances may be needed.

Because NFV started out as a telecommunications feature, many NFV instances are focused on telecommunications. However, NFV is not limited to telecommunication services. In a broad sense, NFV includes one or more VNFs running within a network function virtualization infrastructure (NFVI), such as NFVI 400. Often, the VNFs are inline service functions that are separate from workload servers or other nodes. These VNFs can be chained together into a service chain, which may be defined by a virtual subnetwork, and which may include a serial string of network services that provide behind-the-scenes work, such as security, logging, billing, and similar.

In the example of FIG. 11, an NFV orchestrator 1101 manages a number of the VNFs 1112 running on an NFVI 1100. NFV requires nontrivial resource management, such as allocating a very large pool of compute resources among appropriate numbers of instances of each VNF, managing connections between VNFs, determining how many instances of each VNF to allocate, and managing memory, storage, and network connections. This may require complex software management, thus making NFV orchestrator 1101 a valuable system resource. Note that NFV orchestrator 1101 may provide a browser-based or graphical configuration interface, and in some embodiments may be integrated with SDN orchestration functions.

Note that NFV orchestrator 1101 itself may be virtualized (rather than a special-purpose hardware appliance). NFV orchestrator 1101 may be integrated within an existing SDN system, wherein an operations support system (OSS) manages the SDN. This may interact with cloud resource management systems (e.g., OpenStack) to provide NFV orchestration. An NFVI 1100 may include the hardware, software, and other infrastructure to enable VNFs to run. This may include a hardware platform 1102 on which one or more VMs 1104 may run. For example, hardware platform 1102-1 in this example runs VMs 1104-1 and 1104-2. Hardware platform 1102-2 runs VMs 1104-3 and 1104-4. Each hardware platform may include a hypervisor 1120, virtual machine manager (VMM), or similar function, which may include and run on a native (bare metal) operating system, which may be minimal so as to consume very few resources.

Hardware platforms 1102 may be or comprise a rack or several racks of blade or slot servers (including, e.g., processors, memory, and storage), one or more data centers, other hardware resources distributed across one or more geographic locations, hardware switches, or network interfaces. An NFVI 1100 may also include the software architecture that enables hypervisors to run and be managed by NFV orchestrator 1101.

Running on NFVI 1100 are a number of VMs 1104, each of which in this example is a VNF providing a virtual service appliance. Each VM 1104 in this example includes an instance of the Data Plane Development Kit (DPDK), a virtual operating system 1108, and an application providing the VNF 1112.

Virtualized network functions could include, as nonlimiting and illustrative examples, firewalls, intrusion detection systems, load balancers, routers, session border controllers, DPI services, network address translation (NAT) modules, or call security association.

The illustration of FIG. 11 shows that a number of VNFs 1104 have been provisioned and exist within NFVI 1100. This FIGURE does not necessarily illustrate any relationship between the VNFs and the larger network, or the packet flows that NFVI 1100 may employ.

The illustrated DPDK instances 1116 provide a set of highly-optimized libraries for communicating across a virtual switch (vSwitch) 1122. Like VMs 1104, vSwitch 1122 is provisioned and allocated by a hypervisor 1120. The hypervisor uses a network interface to connect the hardware platform to the data center fabric (e.g., an HFI). This HFI may be shared by all VMs 1104 running on a hardware platform 1102. Thus, a vSwitch may be allocated to switch traffic between VMs 1104. The vSwitch may be a pure software vSwitch (e.g., a shared memory vSwitch), which may be optimized so that data are not moved between memory locations, but rather, the data may stay in one place, and pointers may be passed between VMs 1104 to simulate data moving between ingress and egress ports of the vSwitch. The vSwitch may also include a hardware driver (e.g., a hardware network interface IP block that switches traffic, but that connects to virtual ports rather than physical ports). In this illustration, a distributed vSwitch 1122 is illustrated, wherein vSwitch 1122 is shared between two or more physical hardware platforms 1102.

The foregoing outlines features of several embodiments so that those skilled in the art may better understand various aspects of the present disclosure. The embodiments disclosed can readily be used as the basis for designing or modifying other processes and structures to carry out the teachings of the present specification. Any equivalent constructions to those disclosed do not depart from the spirit and scope of the present disclosure. Design considerations may results in substitute arrangements, design choices, device possibilities, hardware configurations, software implementations, and equipment options.

In certain embodiments, some of the components illustrated herein may be omitted or consolidated. In a general sense, the arrangements depicted in the FIGURES may be more logical in their representations, whereas a physical architecture may include various permutations, combinations, and/or hybrids of these elements.

With the numerous examples provided herein, interaction may be described in terms of two, three, four, or more electrical components. These descriptions are provided for purposes of clarity and example only. Any of the illustrated components, modules, and elements of the FIGURES may be combined in various configurations, all of which fall within the scope of this specification.

In certain cases, it may be easier to describe one or more functionalities by disclosing only selected element. Such elements are selected to illustrate specific information to facilitate the description. The inclusion of an element in the FIGURES is not intended to imply that the element must appear in the disclosure, as claimed, and the exclusion of certain elements from the FIGURES is not intended to imply that the element is to be excluded from the disclosure as claimed.

Similarly, any methods or flows illustrated herein are provided by way of illustration only. Inclusion or exclusion of operations in such methods or flows should be understood the same as inclusion or exclusion of other elements as described in this paragraph. Where operations are illustrated in a particular order, the order is a nonlimiting example only. Unless expressly specified, the order of operations may be altered to suit a particular embodiment.

Other changes, substitutions, variations, alterations, and modifications will be apparent to those skilled in the art. All such changes, substitutions, variations, alterations, and modifications fall within the scope of this specification.

In order to aid the United States Patent and Trademark Office (USPTO) and, any readers of any patent or publication flowing from this specification, the Applicant: (a) does not intend any of the appended claims to invoke paragraph (f) of 35 U.S.C. section 112, or its equivalent, as it exists on the date of the filing hereof unless the words "means for" or "steps for" are specifically used in the particular claims; and (b) does not intend, by any statement in the specification, to limit this disclosure in any way that is not otherwise expressly reflected in the appended claims, as originally presented or as amended.

Example Implementations

There is disclosed in one example, a computing apparatus, comprising: a processor and a memory; instructions encoded within the memory to instruct the processor to: identify a downloaded file on a file system; inspect a metadata object attached to the downloaded file; parse the metadata object to extract an advertiser identification string from a GET code portion of a uniform resource locator (URL); query a reputation cache for a reputation for the advertiser identification string; receive a deceptive reputation for the advertiser identification string; and take a remedial action against the downloaded file.

There is further disclosed an example computing apparatus, wherein the metadata object comprises a Microsoft New Technology File System (NTFS) alternative data stream.

There is further disclosed an example computing apparatus, wherein the ADS comprises a Zone.Identifier data stream.

There is further disclosed an example computing apparatus, wherein an advertiser identifier string comprises a partner or referrer identifier.

There is further disclosed an example computing apparatus, wherein the advertiser identifier string comprises an advertising campaign identifier.

There is further disclosed an example computing apparatus, wherein the advertiser identifier string comprises a union of a partner or referrer identifier and an advertising campaign identifier string.

There is further disclosed an example computing apparatus, wherein the cache is a local cache.

There is further disclosed an example computing apparatus, wherein the cache is a remote global or enterprise cache.

There is further disclosed an example computing apparatus, wherein the instructions are further to cache the reputation locally.

There is also disclosed an example of one or more tangible, non-transitory computer-readable storage media having stored thereon executable instructions to: detect a user interaction with a file system object; inspect a metadata object associated with the file system object; parse the metadata object to extract an identification string that uniquely or nearly-uniquely identifies a third-party advertiser as having advertised the file system object; receive from a reputation cache a reputation for the third-party advertiser; and act on the reputation.

There is further disclosed an example of one or more tangible, non-transitory computer-readable storage media, wherein the user interaction comprises executing the file system object as an installer.

There is further disclosed an example of one or more tangible, non-transitory computer-readable storage media, wherein the reputation is a reputation for deceptivity.

There is further disclosed an example of one or more tangible, non-transitory computer-readable storage media, wherein acting on the reputation comprises blocking execution of the file if the third-party advertiser has a reputation for being deceptive.

There is further disclosed an example of one or more tangible, non-transitory computer-readable storage media, wherein acting on the reputation comprises removing the file if the third-party advertiser has a reputation for being deceptive.

There is further disclosed an example of one or more tangible, non-transitory computer-readable storage media, wherein the metadata object comprises a Microsoft New Technology File System (NTFS) alternative data stream (ADS).

There is further disclosed an example of one or more tangible, non-transitory computer-readable storage media, wherein the ADS comprises a Zone.Identifier data stream.

There is further disclosed an example of one or more tangible, non-transitory computer-readable storage media, wherein acting on the reputation comprises altering the Zone.Identifier data stream to remove the identification stream if the third-party advertiser has a reputation for being deceptive.

There is further disclosed an example of one or more tangible, non-transitory computer-readable storage media, wherein the identification string comprises a partner or referrer identifier.

There is further disclosed an example of one or more tangible, non-transitory computer-readable storage media, wherein the identification string comprises an advertising campaign identifier.

There is further disclosed an example of one or more tangible, non-transitory computer-readable storage media, wherein the advertiser identifier string comprises a union of a partner or referrer identifier and an advertising campaign identifier string.

There is further disclosed an example of one or more tangible, non-transitory computer-readable storage media, wherein the cache is a local cache.

There is further disclosed an example of one or more tangible, non-transitory computer-readable storage media, wherein the cache is a remote global or enterprise cache.

There is further disclosed an example of one or more tangible, non-transitory computer-readable storage media, wherein the instructions are further to cache the reputation locally.

There is also disclosed an example computer-implemented method of detecting and mitigating deceptive advertisements, comprising: detecting a user interaction with an executable file system object; inspecting an alternative data stream associated with the file system object; parsing the alternative data stream to extract an advertiser identification string that identifies a third-party advertiser as having advertised the file system object; querying a reputation store for a reputation for the third-party advertiser; and managing execution of the executable file system object according a deceptiveness parameter of the reputation.

There is further disclosed an example method, wherein the user interaction comprises executing the file system object as an installer.

There is further disclosed an example method, wherein managing execution of the executable file system object comprises blocking execution of the file if the third-party advertiser has a reputation for being deceptive.

There is further disclosed an example method, wherein managing execution of the executable file system object comprises removing the file if the third-party advertiser has a reputation for being deceptive.

There is further disclosed an example method, wherein the alternative data stream comprises a Zone.Identifier data stream.

There is further disclosed an example method, wherein managing execution of the executable file system object comprises altering the Zone.Identifier data stream to remove the identification stream if the third-party advertiser has a reputation for being deceptive.

There is further disclosed an example method, wherein the advertiser identifier string comprises a partner or referrer identifier.

There is further disclosed an example method, wherein the advertiser identifier string comprises an advertising campaign identifier.

There is further disclosed an example method, wherein the advertiser identifier string comprises a union of a partner or referrer identifier and an advertising campaign identifier string.

There is further disclosed an example method, wherein the cache is a local cache.

There is further disclosed an example method, wherein the cache is a remote global or enterprise cache.

There is further disclosed an example method, further comprising caching the reputation locally.

There is further disclosed an example apparatus, comprising means for performing the method of a number of the above examples.

There is further disclosed an example apparatus, wherein the means for performing the method comprise a processor and a memory.

There is further disclosed an example apparatus, wherein the memory comprises machine-readable instructions, that when executed cause the apparatus to perform the method of a number of the above examples.

There is further disclosed an example apparatus, wherein the apparatus is a computing system.

There is further disclosed an example of at least one computer-readable medium comprising instructions that, when executed, implements a method or realize an apparatus as illustrated in a number of the above examples.

There is also disclosed an example enterprise security function, comprising: a processor; a memory; a network interface; and instructions encoded within the memory to: receive an incoming data stream via the network interface; identify the incoming data stream for analysis; determine that the incoming data stream includes an advertisement; identify an advertisement source of the identifier, the advertisement source comprising an identification string; query a reputation cache for a reputation for the advertisement source; receive a deceptive reputation for the advertisement source; and apply a remedial action to the incoming data stream.

There is further disclosed an example enterprise security function, wherein identifying the incoming data stream for analysis comprises inspecting a network protocol of the incoming data stream.

There is further disclosed an example enterprise security function, wherein inspecting the network protocol comprises determining that the network protocol is hypertext transfer protocol secure (HTTPS), and identifying the incoming data stream as not for analysis.

There is further disclosed an example enterprise security function, wherein inspecting the network protocol comprises determining that the network protocol is unsecured hypertext transfer protocol (HTTP), and identifying the incoming data stream for analysis.

There is further disclosed an example enterprise security function, wherein the identification string comprises a referrer or partner identifier.

There is further disclosed an example enterprise security function, wherein the identification string comprises an advertising campaign identifier.

There is further disclosed an example enterprise security function, wherein the identification string comprises a joint referrer or partner identifier and advertising campaign identifier.

There is further disclosed an example enterprise security function, wherein the instructions are further to analyze a web page, determine that the web page is a deceptive advertisement, extract an identification string from a GET code portion of a uniform resource locator (URL), and assign a reputation for deceptiveness to the identification string.

There is further disclosed an example enterprise security function, wherein determining that the web page is a deceptive advertisement comprises applying a heuristic model to the web page.

There is further disclosed an example enterprise security function, wherein determining that the web page is a deceptive advertisement comprises applying a behavioral model to the web page.

There is further disclosed an example enterprise security function, wherein determining that the web page is a deceptive advertisement comprises detecting the use of a shrill sound.

There is further disclosed an example enterprise security function, wherein determining that the web page is a deceptive advertisement comprises detecting the use of flashing fonts or colors.

There is further disclosed an example enterprise security function, wherein determining that the web page is a deceptive advertisement comprises detecting the use of a well-known domain name completely embedded with a URL unassociated with an owner of the well-known domain name.

There is also disclosed an example of one or more tangible, non-transitory computer-readable storage media having stored thereon executable instructions to: intercept a network operation; determine that the network operation should be analyzed for deceptive advertising; extract from a uniform resource locator (URL) of the network operation an advertiser identification string encoded within a hypertext transfer protocol (HTTP) GET portion of the URL; query a reputation cache for a reputation for a third-party advertiser according to the advertiser identification string; receive from the reputation cache a reputation that the third-party advertiser is deceptive; and apply a remedial action to the network operation.

There is further disclosed an example of one or more tangible, non-transitory computer-readable media, wherein determining that the network operation should be analyzed for deceptive advertising comprises inspecting a network protocol of the network operation.

There is further disclosed an example of one or more tangible, non-transitory computer-readable media, wherein inspecting the network protocol comprises determining that the network protocol is hypertext transfer protocol secure (HTTPS), and identifying the network operation as not for analysis.

There is further disclosed an example of one or more tangible, non-transitory computer-readable media, wherein inspecting the network protocol comprises determining that the network protocol is unsecured hypertext transfer protocol (HTTP), and identifying the network operation for analysis.

There is further disclosed an example of one or more tangible, non-transitory computer-readable media, wherein the advertiser identification string comprises a referrer or partner identifier.

There is further disclosed an example of one or more tangible, non-transitory computer-readable media, wherein the advertiser identification string comprises an advertising campaign identifier.

There is further disclosed an example of one or more tangible, non-transitory computer-readable media, wherein the advertiser identification string comprises a joint referrer or partner identifier and advertising campaign identifier.

There is further disclosed an example of one or more tangible, non-transitory computer-readable media, wherein the instructions are further to analyze a web page, determine that the web page is a deceptive advertisement, extract an identification string from a GET code portion of a uniform resource locator (URL), and assign a reputation for deceptiveness to the identification string.

There is further disclosed an example of one or more tangible, non-transitory computer-readable media, wherein determining that the web page is a deceptive advertisement comprises applying a heuristic model to the web page.

There is further disclosed an example of one or more tangible, non-transitory computer-readable media, wherein determining that the web page is a deceptive advertisement comprises applying a behavioral model to the web page.

There is further disclosed an example of one or more tangible, non-transitory computer-readable media, wherein determining that the web page is a deceptive advertisement comprises detecting the use of a shrill sound.

There is further disclosed an example of one or more tangible, non-transitory computer-readable media, wherein determining that the web page is a deceptive advertisement comprises detecting the use of flashing fonts or colors.

There is further disclosed an example of one or more tangible, non-transitory computer-readable media, wherein determining that the web page is a deceptive advertisement comprises detecting the use of a well-known domain name completely embedded with a URL unassociated with an owner of the well-known domain name.

There is also disclosed an example computer-implemented method of detecting and mitigating malicious advertising within an enterprise, comprising: intercepting a network operation; determining that the network operation should be analyzed for deceptive advertising; extracting from a uniform resource locator (URL) of the network operation an advertiser identification string; querying a reputation cache for a reputation for a third-party advertiser according to the advertiser identification string; receiving from the reputation cache a reputation that the third-party advertiser is deceptive; and applying a remedial action to the network operation.

There is further disclosed an example method, wherein determining that the network operation should be analyzed for deceptive advertising comprises inspecting a network protocol of the network operation.

There is further disclosed an example method, wherein inspecting the network protocol comprises determining that the network protocol is hypertext transfer protocol secure (HTTPS), and identifying the network operation as not for analysis.

There is further disclosed an example method, wherein inspecting the network protocol comprises determining that the network protocol is unsecured hypertext transfer protocol (HTTP), and identifying the network operation for analysis.

There is further disclosed an example method, wherein the advertiser identification string comprises a referrer or partner identifier.

There is further disclosed an example method, wherein the advertiser identification string comprises an advertising campaign identifier.

There is further disclosed an example method, wherein the advertiser identification string comprises a joint referrer or partner identifier and advertising campaign identifier.

There is further disclosed an example method, further comprising analyzing a web page, determining that the web page is a deceptive advertisement, extracting an identification string from a GET code portion of a uniform resource locator (URL), and assigning a reputation for deceptiveness to the identification string.

There is further disclosed an example method, wherein determining that the web page is a deceptive advertisement comprises applying a heuristic model to the web page.

There is further disclosed an example method, wherein determining that the web page is a deceptive advertisement comprises applying a behavioral model to the web page.

There is further disclosed an example method, wherein determining that the web page is a deceptive advertisement comprises detecting the use of a shrill sound.

There is further disclosed an example method, wherein determining that the web page is a deceptive advertisement comprises detecting the use of flashing fonts or colors.

There is further disclosed an example method, wherein determining that the web page is a deceptive advertisement comprises detecting the use of a well-known domain name completely embedded with a URL unassociated with an owner of the well-known domain name.

There is further disclosed an example apparatus comprising means for performing the method of a number of the above examples.

There is further disclosed an example apparatus, wherein the means for performing the method comprise a processor and a memory.

There is further disclosed an example apparatus, wherein the memory comprises machine-readable instructions, that when executed cause the apparatus to perform the method of a number of the above examples.

There is further disclosed an example apparatus, wherein the apparatus is a computing system.

There is further disclosed an example of at least one computer-readable medium comprising instructions that, when executed, implement a method or realize an apparatus as illustrated in a number of the above examples.

What is claimed is:

1. A computing apparatus, comprising:
a processor and a memory;
instructions encoded within the memory to instruct the processor to:
identify a downloaded file on a local file system;
inspect a metadata object associated with the downloaded file within the local file system;

parse the metadata object to extract an advertiser identification string from a GET code portion of a uniform resource locator (URL) from which the downloaded file was downloaded, wherein the advertiser identification string identifies a third-party advertiser different from a vendor of the downloaded file;

query a reputation cache for a reputation for the third-party advertiser based at least in part on the advertiser identification string;

receive a deceptive reputation for the third-party advertiser in response to querying the reputation cache; and take a remedial action against the downloaded file in response to receiving the deceptive reputation.

2. The computing apparatus of claim 1, wherein the metadata object comprises a Microsoft New Technology File System (NTFS) alternative data stream (ADS).

3. The computing apparatus of claim 2, wherein the ADS comprises a Zone.Identifier data stream.

4. The computing apparatus of claim 1, wherein an advertiser identification string comprises a partner or referrer identifier.

5. The computing apparatus of claim 1, wherein the advertiser identification string comprises an advertising campaign identifier.

6. The computing apparatus of claim 1, wherein the advertiser identification string comprises a union of a partner or referrer identifier and an advertising campaign identifier string.

7. The computing apparatus of claim 1, wherein the reputation cache is a local cache.

8. The computing apparatus of claim 1, wherein the reputation cache is a remote global or enterprise cache.

9. The computing apparatus of claim 8, wherein the instructions are further to cache the reputation locally.

10. One or more tangible, non-transitory computer-readable storage media having stored thereon executable instructions to:

detect a user interaction with a downloaded file system object on a local file system, wherein the downloaded file system object was previously downloaded;

inspect a metadata object associated with the downloaded file system object within the local file system;

parse the metadata object to extract an identification string that uniquely identifies a third-party advertiser as having referred the downloaded file system object for download from a vendor different from the third-party advertiser;

receive from a reputation cache a reputation for the third-party advertiser in response to querying the reputation cache based at least in part on the identification string; and act on the reputation.

11. The one or more tangible, non-transitory computer-readable storage media of claim 10, wherein the user interaction comprises executing the downloaded file system object as an installer.

12. The one or more tangible, non-transitory computer-readable storage media of claim 10, wherein the reputation is a reputation for deceptivity.

13. The one or more tangible, non-transitory computer-readable storage media of claim 10, wherein acting on the reputation comprises blocking execution of the downloaded file system object if the third-party advertiser has a reputation for being deceptive.

14. The one or more tangible, non-transitory computer-readable storage media of claim 10, wherein acting on the reputation comprises removing the downloaded file system object if the third-party advertiser has a reputation for being deceptive.

15. The one or more tangible, non-transitory computer-readable storage media of claim 10, wherein the metadata object comprises a Microsoft New Technology File System (NTFS) alternative data stream (ADS).

16. The one or more tangible, non-transitory computer-readable storage media of claim 15, wherein the ADS comprises a Zone.Identifier data stream.

17. The one or more tangible, non-transitory computer-readable storage media of claim 16, wherein acting on the reputation comprises altering the Zone.Identifier data stream to remove the identification string if the third-party advertiser has a reputation for being deceptive.

18. A computer-implemented method of scanning a downloaded file on a device-local file system, comprising:

extracting, from a metadata object associated with the downloaded file on the device-local file system, data that identify a third-party advertiser that provided the downloaded file, wherein the third-party advertiser is different from a vendor of the downloaded file;

querying a remote reputation service or a device-local reputation cache for a reputation of the third-party advertiser based at least in part on the extracted data;

receiving a reputation that the third-party advertiser engages in deceptive advertising practices in response to querying the remote reputation; and taking remedial action against the downloaded file in response to receiving the reputation.

19. The method of claim 18, wherein the metadata object comprises a Microsoft New Technology File System (NTFS) alternative data stream (ADS).

20. The method of claim 19, wherein the ADS comprises a Zone.Identifier data stream.

* * * * *